(12) United States Patent
Baeg et al.

(10) Patent No.: US 12,020,464 B2
(45) Date of Patent: Jun. 25, 2024

(54) METHOD OF DETERMINING AN ORIENTATION OF AN OBJECT AND A METHOD AND APPARATUS FOR TRACKING AN OBJECT

(71) Applicants: HYUNDAI MOTOR COMPANY, Seoul (KR); KIA CORPORATION, Seoul (KR)

(72) Inventors: Ju Heon Baeg, Seoul (KR); Byoung Kwang Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 463 days.

(21) Appl. No.: 17/401,040

(22) Filed: Aug. 12, 2021

(65) Prior Publication Data
US 2022/0189040 A1 Jun. 16, 2022

(30) Foreign Application Priority Data
Dec. 11, 2020 (KR) ........................ 10-2020-0173269

(51) Int. Cl.
*G06V 10/25* (2022.01)
*G06T 7/246* (2017.01)
*G06T 7/73* (2017.01)

(52) U.S. Cl.
CPC ............. *G06V 10/25* (2022.01); *G06T 7/251* (2017.01); *G06T 7/75* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 10,677,907 B2 | 6/2020 | Orlowski et al. | |
| 2019/0004166 A1 | 1/2019 | Orlowski et al. | |
| 2019/0130189 A1* | 5/2019 | Zhou | G06V 10/7515 |
| 2020/0279128 A1* | 9/2020 | Hoehne | G06F 18/2113 |
| 2021/0156960 A1* | 5/2021 | Popov | G06V 10/82 |

* cited by examiner

*Primary Examiner* — Leon Viet Q Nguyen
(74) *Attorney, Agent, or Firm* — Lempia Summerfield Katz LLC

(57) ABSTRACT

An object orientation determination method includes generating pixel data on each of a plurality of unit pixels included in a region of interest of a point cloud acquired from an object, generating a plurality of candidate boxes using the generated pixel data, and determining, as a heading angle of an oriented bounding box, an inclination of a candidate box having a smallest cost among costs calculated on the plurality of candidate boxes. A cost of each of the plurality of candidate boxes is calculated based on positions of respective sides of a corresponding one of the plurality of candidate boxes and the pixel data.

14 Claims, 25 Drawing Sheets

⊘ Center of unit pixel

⊗ Actual point

⊘ Center of unit pixel

⊗ Actual point

⊘ Center of unit pixel

⊗ Actual point

⊘ Center of unit pixel

⊗ Actual point

⊘ Center of unit pixel

⊗ Actual point

⊘ Center of unit pixel

⊗ Actual point

⊘ Center of unit pixel

⊗ Actual point

⊘ Center of unit pixel

⊗ Actual point

◎ Center of unit pixel
⊗ Actual point

◎ Center of unit pixel
⊗ Actual point

FIG. 19B

[32] Pixel Map Dst <1.1,6.8>

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 0 | 0 | 0 | 0 | 0 | 0 | 1 | 0 | 1 | 0 | 0 | 0 | 0 | 0 | 0 | 0 |
| 0 | 0 | 0 | 0 | 0 | 0 | 0 | 1 | 5 | 3 | 2 | 2 | 0 | 0 | 0 | 0 | 0 | 0 | 0 |
| 0 | 0 | 0 | 0 | 3 | 1 | 3 | 3 | 0 | 0 | 0 | 0 | 0 | 0 | 0 | 0 | 0 | 0 | 0 |
| 0 | 0 | 0 | 0 | 0 | 2 | 0 | 1 | 1 | 1 | 0 | 0 | 0 | 0 | 0 | 0 | 0 | 0 | 0 |
| 0 | 0 | 0 | 0 | 2 | 0 | 0 | 2 | 4 | 6 | 3 | 1 | 0 | 0 | 0 | 0 | 0 | 0 | 0 |
| 0 | 0 | 0 | 0 | 0 | 0 | 1 | 3 | 1 | 3 | 3 | 0 | 0 | 0 | 0 | 0 | 0 | 0 | 0 |
| 0 | 0 | 0 | 0 | 3 | 1 | 0 | 0 | 7 | 17 | 7 | 0 | 0 | 0 | 0 | 0 | 0 | 0 | 0 |
| 0 | 0 | 0 | 0 | 6 | 0 | 0 | 0 | 2 | 3 | 7 | 1 | 0 | 0 | 0 | 0 | 0 | 0 | 0 |
| 0 | 0 | 0 | 0 | 1 | 0 | 0 | 0 | 0 | 0 | 1 | 0 | 0 | 0 | 0 | 0 | 0 | 0 | 0 |
| 0 | 0 | 0 | 1 | 0 | 0 | 0 | 0 | 2 | 2 | 3 | 1 | 0 | 0 | 0 | 0 | 0 | 0 | 0 |
| 0 | 0 | 0 | 2 | 2 | 0 | 0 | 0 | 0 | 1 | 2 | 1 | 1 | 0 | 0 | 0 | 0 | 0 | 0 |
| 0 | 0 | 0 | 0 | 9 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 5 | 1 | 1 | 1 | 5 | 4 | 4 | 3 | 4 | 1 | 2 | 0 | 0 | 0 |
| 0 | 0 | 0 | 0 | 0 | 1 | 4 | 5 | 5 | 3 | 2 | 3 | 3 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 2 | 0 | 0 | 0 |
| 0 | 0 | 0 | 0 | 0 | 0 | 0 | 0 | 0 | 0 | 0 | 0 | 0 | 0 | 0 | 10 | 0 | 0 | 0 |
| 0 | 0 | 0 | 0 | 0 | 0 | 0 | 0 | 0 | 0 | 0 | 0 | 0 | 0 | 0 | 3 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 3 | 3 | 0 |
| 0 | 3 | 0 | 1 | 0 | 0 | 0 | 0 | 0 | 0 | 0 | 0 | 0 | 1 | 1 | 11 | 2 | 0 |   |
| 0 | 13 | 21 | 9 | 0 | 1 | 2 | 7 | 2 | 0 | 0 | 0 | 2 | 12 | 25 | 23 | 5 | 0 |   |
| 0 | 3 | 29 | 14 | 11 | 5 | 1 | 0 | 4 | 11 | 29 | 25 | 5 | 28 | 16 | 19 | 17 | 1 | 0 |
| 0 | 0 | 4 | 12 | 21 | 16 | 14 | 28 | 17 | 24 | 23 | 25 | 6 | 22 | 16 | 18 | 0 | 0 | 0 |
| 0 | 0 | 0 | 1 | 13 | 17 | 21 | 19 | 5 | 7 | 0 | 0 | 0 | 1 | 6 | 3 | 0 | 0 | 0 |
| 0 | 0 | 0 | 0 | 1 | 3 | 2 | 14 | 11 | 3 | 0 | 1 | 2 | 3 | 3 | 0 | 0 | 0 | 0 |
| 0 | 0 | 0 | 0 | 0 | 0 | 0 | 1 | 0 | 10 | 0 | 2 | 14 | 19 | 0 | 0 | 0 | 0 | 0 |
| 0 | 0 | 0 | 0 | 0 | 0 | 0 | 0 | 1 | 1 | 3 | 25 | 21 | 0 | 0 | 0 | 0 | 0 | 0 |
| 0 | 0 | 0 | 0 | 0 | 0 | 0 | 0 | 3 | 9 | 12 | 19 | 0 | 0 | 0 | 0 | 0 | 0 | 0 |
| 0 | 0 | 0 | 0 | 0 | 0 | 0 | 0 | 3 | 14 | 11 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

METHOD OF DETERMINING AN ORIENTATION OF AN OBJECT AND A METHOD AND APPARATUS FOR TRACKING AN OBJECT

This application claims the benefit of priority to Korean Patent Application No. 10-2020-0173269, filed on Dec. 11, 2020, the entire content of which is hereby incorporated by reference as if fully set forth herein.

BACKGROUND

Field of the Disclosure

The present disclosure relates to a method of determining the orientation of an object, and a method and apparatus for tracking an object.

Discussion of the Related Art

Conventionally, an oriented bounding box (OBB), which indicates the orientation of an object, is generated using points of a point cloud acquired from the object.

However, in the case of generating an OBB using points, there may occur various problems in that the amount of computation required to generate the OBB increases, the external shape of the OBB is skewed by the curved shape of an object, and the heading angle of an object is not accurately extracted. Therefore, research for solving these problems is underway.

SUMMARY

Accordingly, the present disclosure is directed to a method of generating pixel data of an object, a method of determining the orientation of an object, a method and apparatus for tracking an object, and a recording medium storing a program to execute the methods that substantially obviate one or more problems due to limitations and disadvantages of the related art.

The present disclosure provides a method of generating pixel data of an object, a method of determining the orientation of an object, a method and apparatus for tracking an object, and a recording medium storing a program to execute the methods.

However, the objects to be accomplished by the present disclosure are not limited to the above-mentioned objects. Other objects not mentioned herein should be clearly understood by those having ordinary skill in the art from the following description.

A method of generating pixel data of an object according to an embodiment may include: generating a lattice map, composed of a plurality of unit pixels, with respect to a region of interest in a point cloud acquired from an object; selecting a reference point of the region of interest; generating a pixel index indicating a corresponding unit pixel, in which each of all points present in the region of interest is included, among the plurality of unit pixels in the lattice map, with respect to the reference point; and generating pixel data, including information about the number of points included in each of the plurality of unit pixels in the region of interest and the center coordinates of each of the plurality of unit pixels, using the pixel index.

For example, the pixel index of each of the points may be expressed as follows.

$$IdxRow = \text{integer}\left(\frac{|x_s - x_p|}{L}\right)$$

$$IdxCol = \text{integer}\left(\frac{|y_s - y_p|}{L}\right)$$

Here, IdxRow represents the horizontal-axis coordinate of the pixel index and IdxCol represents the vertical-axis coordinate of the pixel index. The symbol $x_s$ represents the vertical-axis coordinate of the reference point, $y_s$ represents the horizontal-axis coordinate of the reference point, $x_p$ represents the vertical-axis coordinate of each of the points to be expressed as the pixel index, $y_p$ represents the horizontal-axis coordinate of each of the points to be expressed as the pixel index, L represents the width or the length of each of the plurality of unit pixels, and integer(k) represents the integer value of k.

For example, the area of each of the plurality of unit pixels may be in inverse proportion to the distance that the region of interest is spaced apart from the position of the entity that acquires the point cloud.

For example, the ratio of the cross-sectional area of the object to the area of each of the plurality of unit pixels may be 50 to 30,000.

According to another embodiment, an object orientation determination method using the method of generating pixel data of an object is disclosed. The method may include: generating a plurality of candidate boxes using information about the center coordinates of each of the plurality of unit pixels included in the pixel data; calculating the costs of the plurality of candidate boxes using information about the center coordinates and the number of points included in the pixel data; selecting the candidate box having the smallest cost among the calculated costs; and extracting the angle at which the selected candidate box is inclined with respect to a vertical axis as a heading angle of an oriented bounding box. Each of the plurality of candidate boxes may include all of the centers of the plurality of unit pixels. The plurality of candidate boxes may be inclined at different angles with respect to the vertical axis.

For example, the calculating the costs of the plurality of candidate boxes may include: obtaining the minimum value among the spacing distances between the center of each of the plurality of unit pixels and respective sides of a corresponding one of the plurality of candidate boxes; multiplying the minimum value of each of the plurality of unit pixels by the number of points included in each of the plurality of unit pixels; and summing the results of multiplication of the plurality of unit pixels to determine the result of summing as the cost of each of the plurality of candidate boxes.

For example, the object orientation determination method may further include generating an oriented bounding box that is inclined by the extracted heading angle with respect to the vertical axis and includes all of the points present in the region of interest.

According to still another embodiment, an object-tracking method may include tracking the object using the oriented bounding box generated by the object orientation determination method.

An object-tracking apparatus according to still another embodiment may include: a data generation unit configured to generate pixel data based on a point cloud acquired from an object; a heading angle extraction unit configured to extract the heading angle of an oriented bounding box from the pixel data; a bounding box generation unit configured to generate an oriented bounding box using the extracted heading angle; and an object-tracking unit configured to track the object using the oriented bounding box. The data generation unit may generate a lattice map, composed of a plurality of unit pixels, with respect to a region of interest in the point cloud. The data generation unit may also select a reference point of the region of interest. The data generation unit may further generate a pixel index indicating a corresponding unit pixel, in which each of all points present in the region of interest is included, among the plurality of unit pixels in the lattice map, with respect to the reference point. The data generation unit may further generate pixel data, including information about the number of points included in each of the plurality of unit pixels in the lattice map and the center coordinates of each of the plurality of unit pixels, using the pixel index. The heading angle extraction unit may generate a plurality of candidate boxes using information about the center coordinates of each of the plurality of unit pixels included in the pixel data. The heading angle extraction unit may also calculate the costs of the plurality of candidate boxes using information about the center coordinates and the number of points included in the pixel data. The heading angle extraction unit may further select the candidate box having the smallest cost among the calculated costs. The heading angle extraction unit may further extract the angle at which the selected candidate box is inclined with respect to the vertical axis as a heading angle of an oriented bounding box. Each of the plurality of candidate boxes may include all of the centers of the plurality of unit pixels, and the plurality of candidate boxes may be inclined at different angles with respect to the vertical axis.

According to still another embodiment, a computer-readable recording medium in which a program for executing a method of generating pixel data of an object is recorded may store a program to implement a number of functions. The functions may include a function of generating a lattice map, composed of a plurality of unit pixels, with respect to a region of interest in a point cloud acquired from an object. The functions may further include a function of selecting a reference point of the region of interest. The functions may further include a function of generating a pixel index indicating a corresponding unit pixel, in which each of all points present in the region of interest is included, among the plurality of unit pixels in the lattice map, with respect to the reference point. The functions may further include a function of generating pixel data, including information about the number of points included in each of the plurality of unit pixels in the region of interest and the center coordinates of each of the plurality of unit pixels, using the pixel index.

According to still another embodiment, a computer-readable recording medium in which a program for executing a method of generating the oriented bounding box of an object using the method of generating pixel data is recorded may store a program to implement a number of functions. The functions may include a function of generating a plurality of candidate boxes using information about the center coordinates of each of the plurality of unit pixels included in the pixel data. The functions may further include a function of calculating the costs of the plurality of candidate boxes using information about the center coordinates and the number of points included in the pixel data. The functions may further include a function of selecting the candidate box having the smallest cost among the calculated costs. The functions may further include a function of extracting the angle at which the selected candidate box is inclined with respect to a vertical axis as a heading angle of an oriented bounding box. The functions may further include a function of generating an oriented bounding box that is inclined by the extracted heading angle with respect to the vertical axis and includes all of the points present in the region of interest. Each of the plurality of candidate boxes may include all of the centers of the plurality of unit pixels. The plurality of candidate boxes may be inclined at different angles with respect to the vertical axis.

According to still another embodiment, a computer-readable recording medium in which a program for executing an object-tracking method is recorded may store a program to implement a function of tracking the object using the oriented bounding box.

BRIEF DESCRIPTION OF THE DRAWINGS

Arrangements and embodiments are described in detail with reference to the following drawings, in which like reference numerals refer to like elements and wherein:

FIGS. 19A and 19B are diagrams for explaining an application example of an embodiment of the present disclosure.

DETAILED DESCRIPTION OF THE DISCLOSURE

The present disclosure is now described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete and more fully convey the scope of the disclosure to those having ordinary skill in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element should be considered herein as being "configured to" meet that purpose or to perform that operation or function.

Hereinafter, a method of generating pixel data of an object, a method of determining the orientation of an object, a method and apparatus for tracking an object, and a recording medium storing a program to execute the methods according to embodiments are described with reference to the accompanying drawings. The method of generating pixel data of an object, the method of determining the orientation of an object, the method and apparatus for tracking an object, and the recording medium storing a program to execute the methods according to the embodiments are described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. In other words, the x-axis, the y-axis, and the z-axis may intersect each other obliquely.

Figure 1:
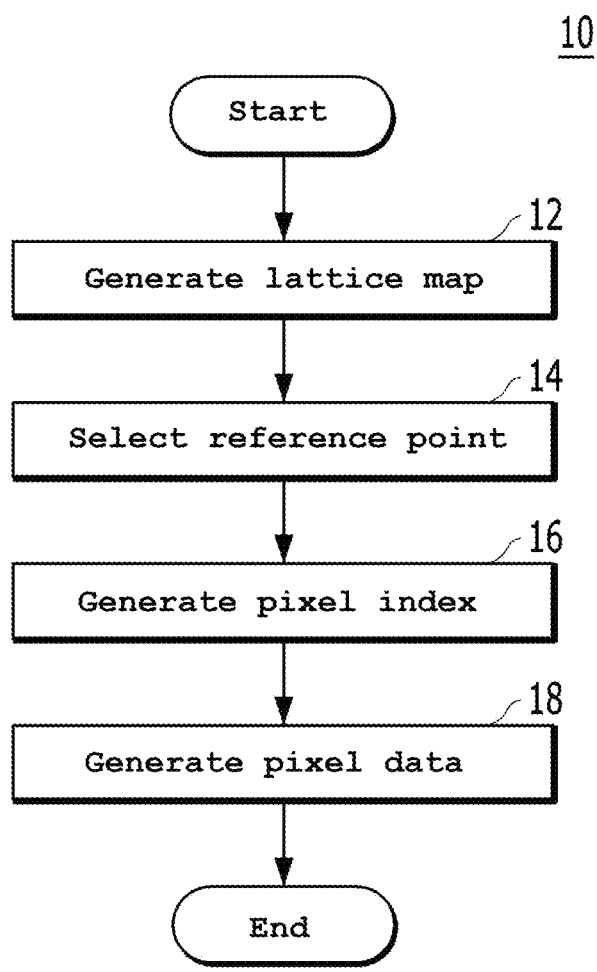
FIG. 1 is a flowchart of a method of generating pixel data of an object according to an embodiment of the present disclosure.

FIG. 1 is a flowchart of a method 10 of generating pixel data of an object according to an embodiment. FIG. 2 is a diagram to assist in understanding the pixel data generation method 10 shown in FIG. 1.

Hereinafter, the method 10 of generating pixel data of an object according to an embodiment of the present disclosure is described.

A lattice map, which is composed of unit pixels, is generated with respect to a region of interest (ROI) in a point cloud acquired from an object (step 12). For example, the point cloud related to an object may be acquired by a light detection and ranging (LiDAR) sensor 110, which is described below with reference to FIG. 9, but the embodiments are not limited thereto. In other words, the embodiments are not limited as to the specific type of sensor used to acquire a point cloud.

According to an embodiment, in step 12, a lattice map is generated with respect to a coordinate space in which each point of a point cloud is located. The lattice map is composed of a plurality of lattices.

Hereinafter, each of the plurality of lattices included in the lattice map is referred to as a "unit pixel". Referring to FIG. 2B, the unit pixel may have a length X in the x-axis direction and a width Y in the y-axis direction. Hereinafter, the unit pixel is described as having a square shape (X=Y), but the embodiments are not limited as to the specific shape of the unit pixel.

For example, the area (PA=XY) of the unit pixel (e.g. UPX) may be in inverse proportion to the distance at which the region of interest (ROI) 20 is spaced apart from the position of the entity that acquires the point cloud. For example, when the point cloud is acquired by a LiDAR sensor, the position of the LiDAR sensor may correspond to the position of the aforementioned entity.

In addition, the ratio R of the cross-sectional area OA of the object to the area PA of the unit pixel may be expressed using Equation 1 below. For example, the ratio R may be 50 to 30,000. In another embodiment, ratio R may be 100 to 7,000, and in another embodiment, 5,000. However, the embodiments are not limited to a specific ratio R.

$$R = \frac{OA}{PA} \qquad \text{[Equation 1]}$$

Figure 2A:
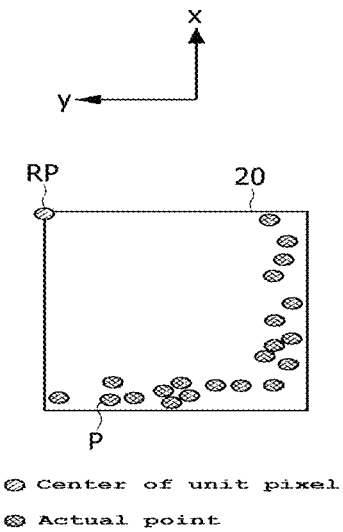
FIGS. 2A-2D are diagrams to assist in understanding the pixel data generation method shown in FIG. 1.
Figure 2B:
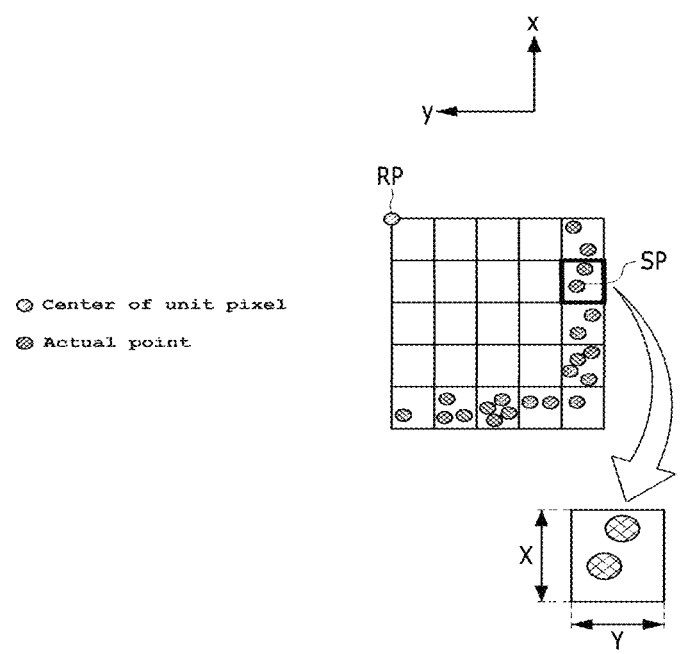

For example, as shown in FIG. 2A, a plurality of points P may be included in the ROI 20 in the point cloud.

After step 12, a reference point of the ROI 20 is selected (step 14). For example, as shown in FIG. 2A, the reference point RP of the ROI 20 may be selected. Here, the reference point RP may be located at the point where the maximum value in the x-axis direction and the maximum value in the y-axis direction in the ROI 20 meet.

After step 14, a pixel index is generated (step 16). The pixel index indicates a corresponding unit pixel in which each of all points P present in the ROI 20 is included among the unit pixels of the lattice map with respect to the reference point RP. For example, referring to FIG. 2B, the pixel index of a search point SP in the ROI 20 with respect to the reference point RP may be generated, as expressed using Equations 2 and 3 below.

$$IdxRow = \text{integer}\left(\frac{|x_s - x_p|}{L}\right) \qquad \text{[Equation 2]}$$

$$IdxCol = \text{integer}\left(\frac{|y_s - y_p|}{L}\right) \qquad \text{[Equation 3]}$$

Here, "$x_s$" represents the vertical-axis coordinate of the reference point RP, "$y_s$" represents the horizontal-axis coordinate of the reference point RP, "$x_p$" represents the vertical-axis coordinate of the search point SP, and "$y_p$" represents the horizontal-axis coordinate of the search point SP. In this case, "IdxRow" represents the horizontal-axis coordinate of the pixel index with respect to the search point SP and "IdxCol" represents the vertical-axis coordinate of the pixel index with respect to the search point SP. Further, "L" represents the width Y or the length X of the unit pixel and "integer(k)" represents the integer value of "k".

In the same method as the method of obtaining the pixel index with respect to the search point SP, as expressed in Equations 2 and 3 set forth above, pixel indexes with respect to respective points present in the ROI 20 may be obtained.

Figure 2C:
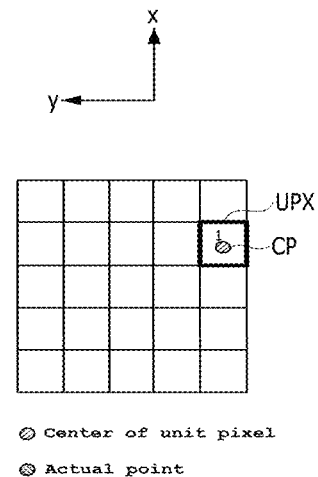
Figure 2D:
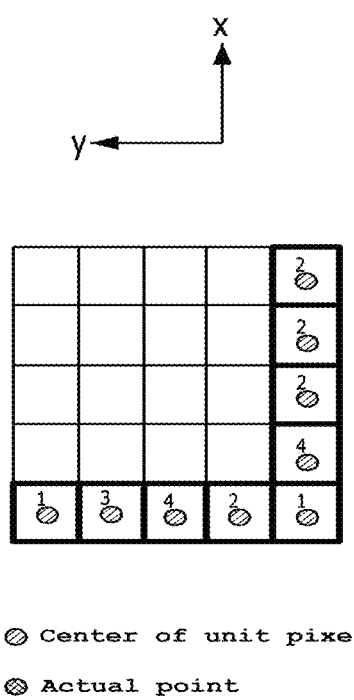

After step 16, pixel data is generated using the pixel indexes (step 18). The pixel data may include information about the number of points included in each of the unit pixels in the ROI 20 and the coordinates of the center of each of the unit pixels (hereinafter referred to as "center coordinates"). For example, as described above, pixel indexes with respect to respective points included in the ROI 20 are generated, whereby pixel data on each of all the unit pixels in the ROI 20 may be generated. For example, as shown in FIG. 2C, when the pixel index of the search point SP is generated, the counted number of points included in the unit pixel UPX may be one, and the center coordinates CP of the unit pixel UPX may be generated. As such, when a pixel index is generated with respect to each of all points (21 points in the case of FIG. 2) included in the ROI 20, information about the number of points included in each of the unit pixels in the ROI 20 and the center coordinates CO may be generated as pixel data, as shown in FIG. 2D. For example, the structure configured as illustrated in FIG. 2D may be stored.

The method 10 of generating pixel data of an object according to the embodiment described above may be used in various fields. In addition, an oriented bounding box (OBB) having information on the orientation of an object may be generated in various ways using pixel data generated by the method 10 of generating pixel data of an object according to the embodiment.

Hereinafter, a method 30 of determining the orientation of an object according to an embodiment for generating an oriented bounding box (OBB) of an object using pixel data generated by the method 10 of generating pixel data of an object according to the above-described embodiment is described with reference to the accompanying drawings.

According to an embodiment, a pixel data on each of a plurality of unit pixels included in a region of interest of a point cloud acquired from an object is generated. Thereafter, a plurality of candidate boxes using the generated pixel data are generated. Thereafter, an inclination of a candidate box having a smallest cost among costs calculated on the plurality of candidate boxes is determined as a heading angle of an oriented bounding box. Here, a cost of each of the plurality of candidate boxes may be calculated based on positions of respective sides of a corresponding one of the plurality of candidate boxes and the pixel data.

Figure 3:
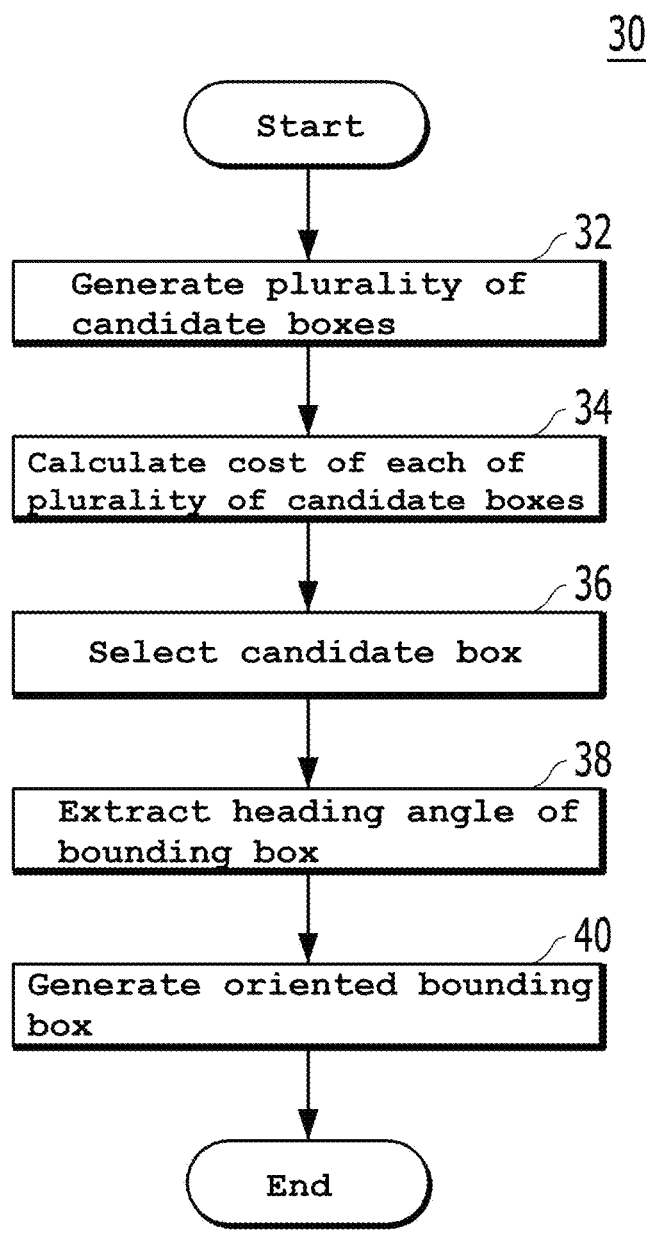
FIG. 3 is a flowchart of a method of determining the orientation of an object according to an embodiment of the present disclosure.

FIG. 3 is a flowchart of a method 30 of determining the orientation of an object according to an embodiment. FIGS. 4A-4F are diagrams for explaining the process of generating a candidate box.

According to the method 30 of determining the orientation of an object according to the embodiment, a plurality of candidate boxes are generated first using information about the center coordinates of each of the unit pixels included in the pixel data generated by the pixel data generation method 10 shown in FIG. 1 (step 32). Here, each of the candidate boxes includes all of the centers of the unit pixels included in the ROI 20 and may be inclined at different angles with respect to the vertical axis (e.g. the x-axis).

Figure 4A:
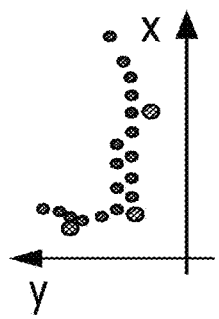
FIGS. 4A-4F are diagrams for explaining the process of generating a candidate box.
Figure 4B:
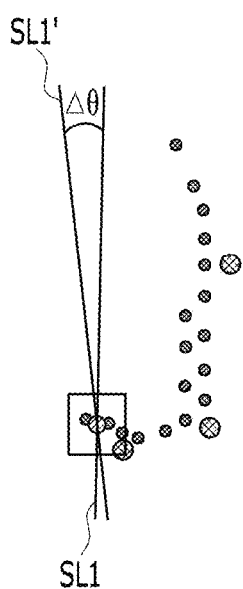

First, a first straight line SL1 is obtained, as shown in FIG. 4B. The first straight line SL1 passes through the largest center coordinates in the y-axis direction, among the center coordinates of the unit pixels included in the ROI, and has a first inclination with respect to the x-axis.

Figure 4C:
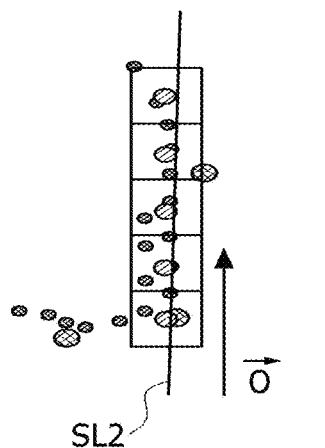

Thereafter, a second straight line SL2 is obtained, as shown in FIG. 4C. The second straight line SL2 passes through the smallest center coordinates in the y-axis direction, among the center coordinates of the unit pixels included in the ROI, and has a first inclination with respect to the x-axis. The first straight line SL1 and the second straight line SL2, which have the same first inclination, are parallel to each other.

Figure 4D:
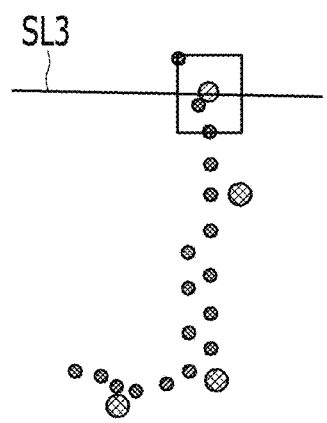

Thereafter, a third straight line SL3 is obtained, as shown in FIG. 4D. The third straight line SL3 passes through the largest center coordinates in the x-axis direction, among the center coordinates of the unit pixels included in the ROI, and is perpendicular to the first straight line SL1 (or the second straight line SL2).

Figure 4E:
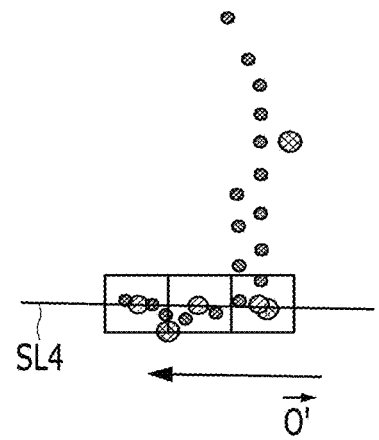
Figure 4F:
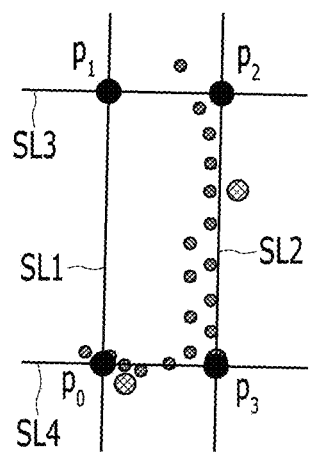

Thereafter, a fourth straight line SL4 is obtained, as shown in FIG. 4E. The fourth straight line SL4 passes through the smallest center coordinates in the x-axis direction, among the center coordinates of the unit pixels included in the ROI, and is perpendicular to the first straight line SL1 (or the second straight line SL2). Here, the third straight line SL3 and the fourth straight line SL4, which have the same inclination, are parallel to each other.

Thereafter, the first to fourth straight lines SL1 to SL4 intersect to form four corner points $p_0$, $p_1$, $p_2$ and $p_3$, whereby a first candidate box, which has a first inclination and is defined by the four corner points $p_0$, $p_1$, $p_2$ and $p_3$, may be generated. Here, the inclination of each candidate box is the angle at which the first straight line SL1 (or the second straight line SL2) is inclined with respect to the x-axis.

Thereafter, using a first straight line SL1' shown in FIG. 4B, which has a second inclination that is greater than the first inclination by a predetermined incremental angle $\Delta\theta$ in the clockwise direction or the counterclockwise direction with respect to the x-axis, a second candidate box having the second inclination may be generated in the same method as the method of generating the first candidate box.

For example, in the case in which the inclination that corresponds to the angle $\theta$ with respect to the x-axis ranges from 0° to 90°, when it is intended to generate candidate boxes having different inclinations by increasing the angle by 10°, first to tenth candidate boxes respectively having first to tenth inclinations of 0°, 10°, 20°, 30°, 40°, 50°, 60°, 70°, 80° and 90° may be generated.

Figure 5:
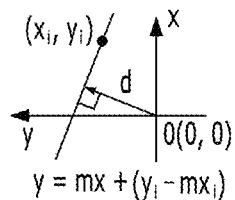
FIG. 5 is a diagram geometrically showing a distance function that returns the distance between a straight line defining a candidate box and an origin point.

FIG. 5 is a diagram geometrically showing a distance function that returns the distance between a straight line defining a candidate box and an origin point. Here, the distance function is a function that returns "d" in the drawing.

Four straight lines SL1, SL2, SL3 and SL4 defining each candidate box may be expressed using Equations 4-7 below.

$$SL1: y=mx+(y_1-mx_1) \ldots (x_1,y_1):(x_i,y_i) \text{ when distance}(x_i,y_i,m) \text{ was maximum in } P(i=0,1,\ldots,n-1) \quad \text{[Equation 4]}$$

$$SL2: y=mx+E(y_2-mx_2) \ldots (x_2,y_2):(x_i,y_i) \text{ when distance}(x_i,y_i,m) \text{ was minimum in } P(i=0,1,\ldots,n-1) \quad \text{[Equation 5]}$$

$$SL3: y=m'x+(y_3-m'x_3) \ldots (x_3,y_3):(x_i,y_i) \text{ when distance}(x_i,y_i,m) \text{ was maximum in } P(i=0,1,\ldots,n-1) \quad \text{[Equation 6]}$$

$$SL4: y=m'x+(y_4-m'x_4) \ldots (x_4,y_4):(x_i,y_i) \text{ when distance}(x_i,y_i,m) \text{ was minimum in } P(i=0,1,\ldots,n-1) \quad \text{[Equation 7]}$$

In Equations 4-7 above, "P" represents a set of pixel data and is expressed using Equation 8 below, "m" and "m'" are expressed using Equations 9 and 10 below, respectively, "distance($x_i$, $y_i$, m)" is shown in FIG. 5, and "i" represents the unique number (or, identification) of a unit pixel, which distinguishes the pixel from other pixels in the ROI.

$$P\{p|p(x_i,y_i), i=0,1,2,\ldots,n-1\} \quad \text{[Equation 8]}$$

Here, "n" represents the number of unit pixels.

$$m=\tan(O(\theta)) \quad \text{[Equation 9]}$$

Here, "$O(\theta)$" represents the inclination angle using the value of "degree".

$$m'=\tan(O'(\theta)) \quad \text{[Equation 10]}$$

Here, "O'(θ)" represents an angle perpendicular to the inclination angle using the value of "degree".

After step 32, the cost of each of the candidate boxes is calculated using information about the center coordinates and the number of points included in the pixel data (step 34).

Figure 6:
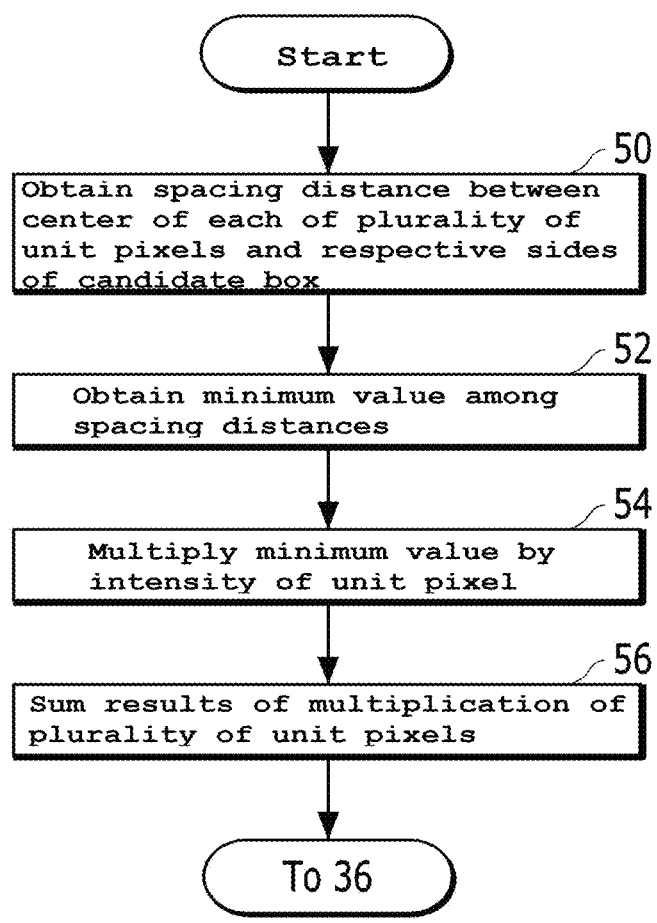
FIG. 6 is a flowchart of an embodiment of step 34 shown in FIG. 3.
Figure 7:
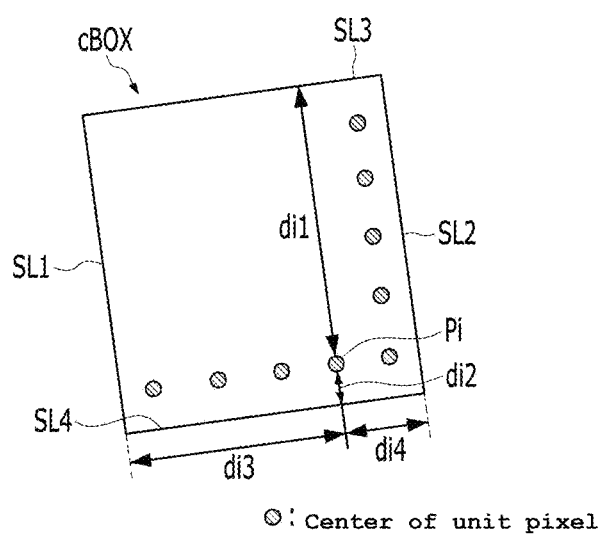
FIG. 7 is a diagram to assist in understanding FIG. 6.

FIG. 6 is a flowchart of an embodiment 34A of step shown in FIG. 3, and FIG. 7 is a diagram for helping understanding FIG. 6. The points included in the candidate box cBOX shown in FIG. 7 represent the center coordinates of the unit pixels.

In order to perform step 34A, the spacing distances between the center coordinates (or the center) of each of the unit pixels included in the ROI and respective sides of a candidate box are obtained first (step 50). For example, referring to FIG. 7, the spacing distances $d_i1$, $d_i2$, $d_i3$ and $d_i4$ between the center coordinates (e.g. $p_i$) of each of the unit pixels included in the ROI and respective sides SL1, SL2, SL3 and SL4 of a candidate box cBOX are obtained.

After step 50, the minimum value among the spacing distances is obtained using Equation 11 below (step 52).

$$c_i = \min(d_i1, d_i2, d_i3, d_i4) \quad \text{[Equation 11]}$$

Here, "$c_i$" represents the minimum value among the spacing distances $d_i1$, $d_i2$, $d_i3$ and $d_i4$.

For example, referring to FIG. 7, the minimum value (e.g. $d_i2$) among the spacing distances $d_i1$, $d_i2$, $d_i3$ and $d_i4$ is obtained.

After step 52, the process of multiplying the minimum values of respective unit pixels included in the ROI by the intensities of corresponding unit pixels is performed (step 54). Here, "intensity" refers to the number of points included in each unit pixel.

After step 54, the results of multiplying the minimum values of respective unit pixels by the intensities of corresponding unit pixels are summed, as expressed using Equation 12 below. The result of the summing is determined to be the cost of a candidate box. Thereafter, the process goes to step 36 shown in FIG. 3 (step 56).

$$C_b = \sum_{i=0}^{n-1} I_i \cdot c_i \quad \text{[Equation 12]}$$

Here, "$C_θ$" represents the cost of a candidate box, and "$I_i$" represents the intensity thereof.

The above-described steps 50 to 56 are performed on each of all candidate boxes obtained in step 32, and thus the cost of each of the candidate boxes is calculated.

Referring again to FIG. 3, a candidate box having the smallest one of the costs calculated with respect to the candidate boxes is selected (step 36).

The angle at which the candidate box selected in step 36 is inclined with respect to the vertical axis (e.g. the x-axis) is extracted as a heading angle of an oriented bounding box (step 38). In other words, the inclination of the selected candidate box is determined to be the extracted heading angle.

Figure 8A:
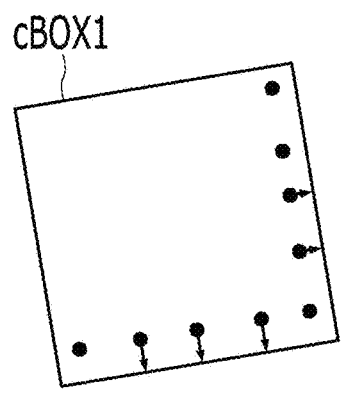
FIGS. 8A and 8B show candidate boxes.
Figure 8B:
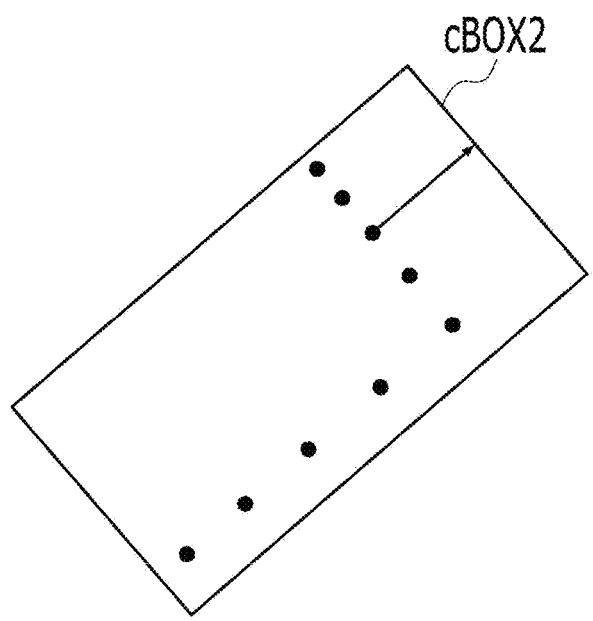

FIGS. 8A and 8B show candidate boxes cBOX1 and cBOX2. Here, the inclination of the candidate box cBOX1 shown in FIG. 8A, i.e. the angle at which the candidate box cBOX1 is inclined with respect to the x-axis, is 11°, and the inclination of the candidate box cBOX2 shown in FIG. 8B is 35°.

Among the candidate boxes cBOX1 and cBOX2 shown in FIGS. 8A and 8B, if the candidate box cBOX1 shown in FIG. 8A has a smaller cost than the candidate box cBOX2 shown in FIG. 8B, the inclination of the candidate box cBOX1, which is 11°, is extracted as a heading angle of an oriented bounding box.

After step 38, an oriented bounding box (OBB), which is inclined by the extracted heading angle with respect to the vertical axis (e.g. the x-axis) and includes all of the points present in the ROI, is generated (step 40). In this case, because the points related to an actual object, which is recognized by a sensor (e.g. a LiDAR sensor) generating a point cloud, may not be included, the oriented bounding box may be generated using the actual points, rather than a plurality of unit pixels.

The above-described oriented bounding box may be used in various fields. For example, the oriented bounding box may be used for a vehicle equipped with a sensor (hereinafter referred to as a "host vehicle") to track an object. In other words, the moving direction of an object is recognized using the oriented bounding box, which may assist in recognizing the situation in which another vehicle suddenly comes close to the host vehicle or the traveling environment, such as the state of traffic in an intersection. In addition, it may contribute to securing excellent real-time performance that is applicable to a vehicle embedded system.

The oriented bounding box generated by the above-described method 30 of determining the orientation of an object may be used to track an object in an object-tracking method and apparatus using a LiDAR sensor according to embodiments.

Hereinafter, an object-tracking method and an apparatus using a LiDAR sensor according to embodiments are described with reference to the accompanying drawings.

Figure 9:
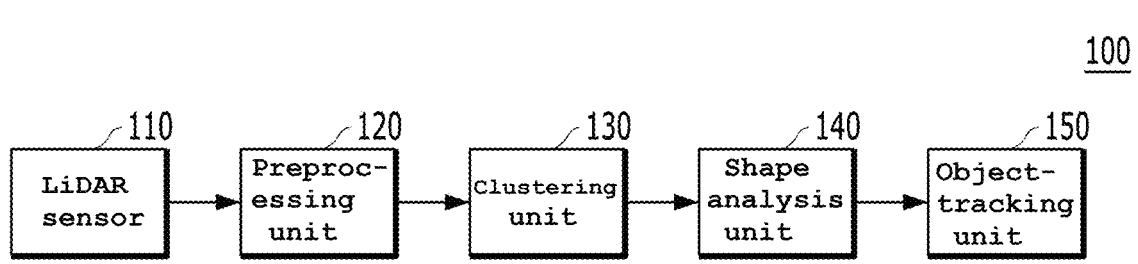
FIG. 9 is a block diagram of an object-tracking apparatus according to an embodiment of the present disclosure.

FIG. 9 is a block diagram of an object-tracking apparatus according to an embodiment. The object-tracking apparatus may include a LiDAR sensor 110, a preprocessing unit 120, a clustering unit 130, a shape analysis unit (or a segment unit) 140, and an object-tracking unit (a tracking unit, a tracking and classification unit, or an object-detecting unit) 150.

The LiDAR sensor 110 obtains a point cloud related to an object. For example, the LiDAR sensor 110 may radiate a single circular laser pulse having a wavelength of 905 nm to 1550 nm to an object and may measure the time taken for the laser pulse reflected from the object present within a measurement range to return, and thus sense information about the object. For example, the information may include the distance from the LiDAR sensor 110 to the object, the orientation of the object, the speed of the object, the temperature of the object, the material distribution of the object, and the concentration characteristics of the object. Here, the object may be, for example, another vehicle (hereinafter referred to as a "target vehicle"), a person, or an obstacle present outside the host vehicle in which the LiDAR sensor 110 is mounted. However, the embodiments are not limited to any specific type of object.

The preprocessing unit 120 may remove data related to reflection from the body of the host vehicle. In other words, since there is a region that is shielded by the body of the host vehicle depending on the mounting position and the field of view of the LiDAR sensor 110, the preprocessing unit 120 may remove data related to reflection from the body of the host vehicle. The preprocessing unit 120 may be omitted from the object-tracking apparatus 100.

The clustering unit 130 groups the point cloud, which is the LiDAR data composed of a plurality of points related to the object acquired through the LiDAR sensor 110, into meaningful units according to a predetermined criterion. If the preprocessing unit 120 is not omitted, the clustering unit 130 may group the LiDAR data preprocessed by the preprocessing unit 120. The result of sensing by the LiDAR sensor 110 shows a plurality of points, each of which has only information about a location (or coordinates). Therefore, the clustering unit 130 serves to group the plurality of points sensed by the LiDAR sensor 110 into units having meaningful shapes and to generate clusters, which are the result of grouping.

The shape analysis unit 140 generates information about a plurality of segment boxes for each channel using the result of clustering by the clustering unit 130. Here, the segment box may be the result of converting the result of clustering into a geometric box shape and may correspond to the above-described oriented bounding box. In addition, the information about the segment box may be at least one of the width, length, position, or direction (or heading) of the segment box.

The object-tracking unit 150 may track whether the object, the shape of which has been analyzed, is an obstacle, a vehicle, or a person, and may recognize the same.

Figure 10:
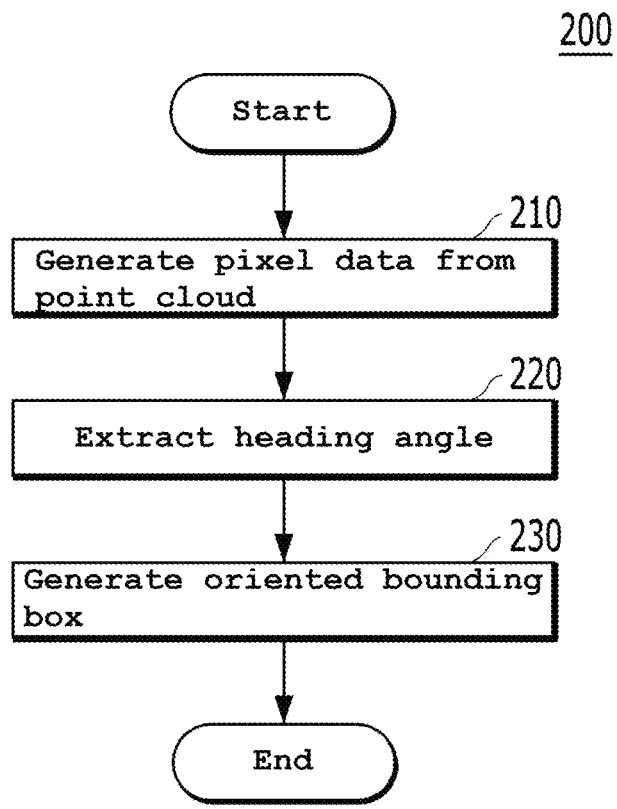
FIG. 10 is a flowchart of an object-tracking method according to an embodiment of the present disclosure.
Figure 11:
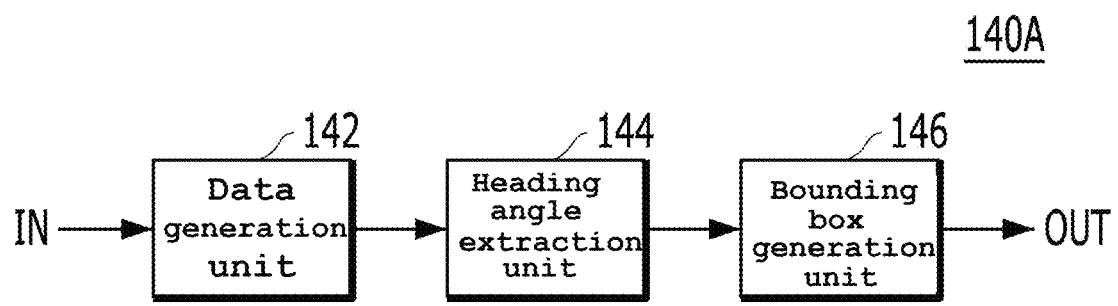
FIG. 11 is a block diagram of an embodiment of the shape analysis unit shown in FIG. 9.

FIG. 10 is a flowchart of an object-tracking method 200 according to an embodiment. FIG. 11 is a block diagram of an embodiment 140A of the shape analysis unit 140 shown in FIG. 9.

Although the object-tracking method 200 shown in FIG. 10 is described as being performed by the shape analysis unit 140A shown in FIG. 11, the embodiment is not limited thereto. In other words, according to another embodiment, the object-tracking method 200 shown in FIG. 10 may be performed by a shape analysis unit configured differently from the shape analysis unit 140A shown in FIG. 11.

The object-tracking method 200 according to an embodiment is performed as follows.

A data generation unit 142 generates pixel data based on the point cloud received through an input terminal IN and outputs the generated pixel data to a heading angle extraction unit 144 (step 210). Step 210 may be performed by the pixel data generation method 10 described above with reference to FIG. 1. In other words, the data generation unit 142 generates a lattice map, which is composed of unit pixels, with respect to an ROI in the point cloud, selects a reference point of the ROI, generates a pixel index. The pixel index indicates the positional relationship between each of all the points present in the ROI and a corresponding one of the unit pixels of the lattice map with respect to the reference point. The data generation unit 142 generates pixel data, which includes information about the number of points included in each of the unit pixels in the lattice map and the center coordinates of each of the unit pixels, using the pixel index. A duplicate description of other aspects has been omitted.

After step 210, the heading angle extraction unit 144 extracts the heading angle of the oriented bounding box from the pixel data, and outputs the extracted heading angle to a bounding box generation unit 146 (step 220). Step 220 may be performed by steps 32 to 38 of the method 30 of determining the orientation of an object described above with reference to FIG. 3. In other words, the heading angle extraction unit 144 generates a plurality of candidate boxes using information about the center coordinates of each of the unit pixels included in the pixel data, calculates the costs of the candidate boxes using information about the center coordinates and the number of points included in the pixel data, selects the candidate box having the smallest cost among the calculated costs, and extracts the inclination, as a heading angle of the oriented bounding box. The inclination is the angle at which the selected candidate box is inclined with respect to the vertical axis. Here, as described above, each of the plurality of candidate boxes includes all of the centers of the unit pixels, and the candidate boxes are inclined at different angles with respect to the vertical axis. A duplicate description of other aspects has been omitted.

After step 220, the bounding box generation unit 146 generates an oriented bounding box using the heading angle extracted by the heading angle extraction unit 144 and outputs the generated oriented bounding box to the object-tracking unit 150 through an output terminal OUT (step 230). Here, since step 230 is the same as step 40 described above with reference to FIG. 3, a duplicate description thereof has been omitted.

Thereafter, the object-tracking unit 150 shown in FIG. 9 tracks the object using the oriented bounding box generated by the bounding box generation unit 146.

According to an embodiment, a computer-readable recording medium in which a program for executing the method of generating pixel data of an object is recorded may store a program for implementing a number of functions. The functions may include a function of generating a lattice map, which is composed of unit pixels, with respect to an ROI in a point cloud acquired from an object. The functions may further include a function of selecting a reference point of the ROI. The functions may further include a function of generating a pixel index, which indicates the positional relationship between each of all the points present in the ROI and a corresponding one of the unit pixels of the lattice map with respect to the reference point. The functions may further include a function of generating pixel data, which includes information about the number of points included in each of the unit pixels in the ROI and the center coordinates of each of the unit pixels, using the pixel index.

According to another embodiment, a computer-readable recording medium in which a program for executing the method 30 of determining the orientation of an object is recorded may store a program for implementing a number of functions. The functions may include a function of generating a plurality of candidate boxes using information about the center coordinates of each of the unit pixels included in the pixel data. The functions may further include a function of calculating the costs of the candidate boxes using information about the center coordinates and the number of points included in the pixel data. The functions may further include a function of selecting the candidate box having the smallest cost among the calculated costs. The functions may further include a function of extracting the inclination, which is the angle at which the selected candidate box is inclined with respect to the vertical axis, as a heading angle of the oriented bounding box. The functions may further include a function of generating an oriented bounding box, which is inclined by the extracted heading angle with respect to the vertical axis and includes all of the points present in the ROI. Here, each of the plurality of candidate boxes may include all of the centers of the unit pixels, and the candidate boxes may be inclined at different angles with respect to the vertical axis.

According to still another embodiment, a computer-readable recording medium in which a program for executing the object-tracking method is recorded may store a program for implementing a function of tracking the object using the oriented bounding box (OBB) generated by the object orientation determination method 30.

The computer-readable recording medium includes all kinds of recording devices in which data that may be read by a computer system are stored. Examples of the computer-readable recording medium include a Read-Only Memory (ROM), a Random Access Memory (RAM), a Compact Disk ROM (CD-ROM), a magnetic tape, a floppy disc, and an optical data storage. The computer-readable recording medium can also be distributed over network-connected computer systems so that the computer-readable code is stored and executed in a distributed fashion. Also, functional programs, code, and code segments for accomplishing the object-tracking method can be easily construed by those, e.g. programmers, having ordinary skill in the art to which the present disclosure pertains.

Hereinafter, a comparative example and an embodiment of the present disclosure are described with reference to the accompanying drawings.

An object-tracking apparatus according to a comparative example extracts a heading angle in point units, rather than pixel units. This is described below in detail.

FIGS. 12A-12F are diagrams for explaining a candidate box generation method according to a comparative example. FIG. 13 shows an example of the candidate box generated by the comparative example.

Figure 12A:
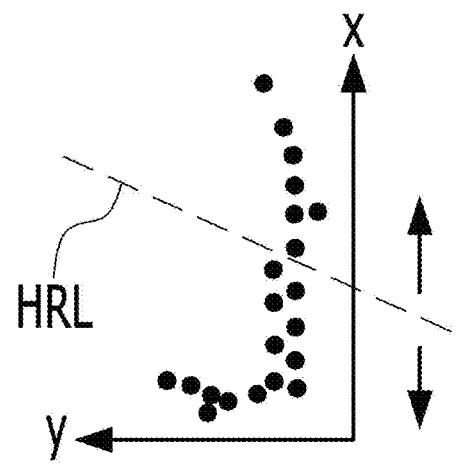
FIGS. 12A-12F are diagrams for explaining a candidate box generation method according to a comparative example.
Figure 12B:
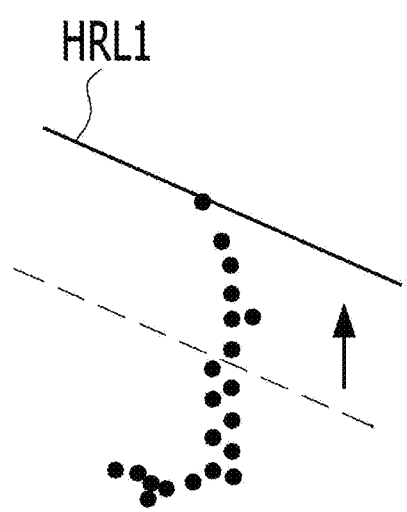
Figure 13:
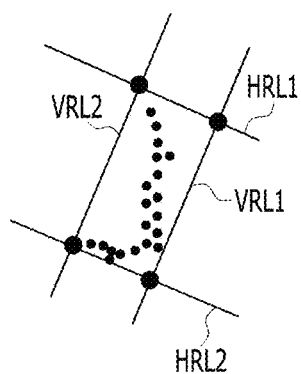
FIG. 13 shows an example of the candidate box generated by the comparative example.

According to the object orientation determination method according to the comparative example, as shown in FIG. 12B, a first horizontal reference straight line HRL1 is obtained first. The first horizontal reference straight line HRL1 passes through the point having the largest x-axis coordinate value on the basis of a horizontal reference straight line HRL (refer to FIG. 12A), among a plurality of points included in the ROI.

Figure 12C:
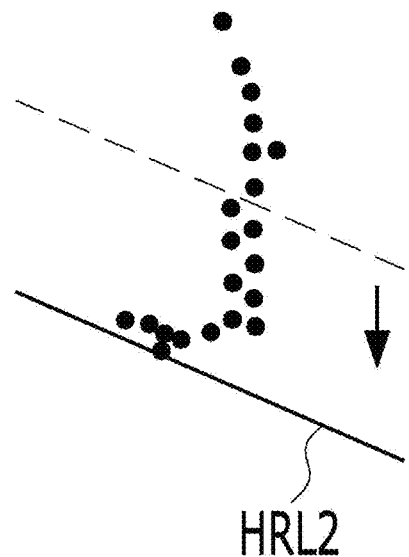
Figure 12D:
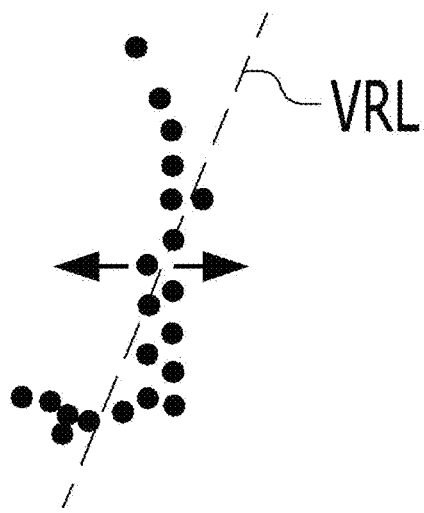

Thereafter, as shown in FIG. 12C, a second horizontal reference straight line HRL2 is obtained. The second horizontal reference straight line HRL2 passes through the point having the smallest x-axis coordinate value on the basis of the horizontal reference straight line HRL, among the plurality of points included in the ROI. Here, the first and second horizontal reference straight lines HRL1 and HRL2 are parallel to the horizontal reference straight line HRL.

Figure 12E:
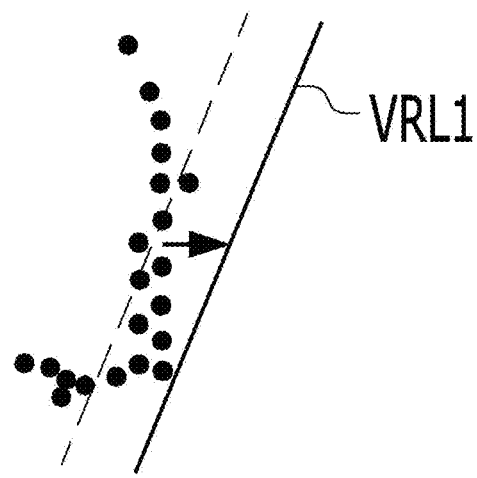

Thereafter, as shown in FIG. 12E, a first vertical reference straight line VRL1 is obtained. The first vertical reference straight line VRL1 passes through the point having the smallest y-axis coordinate value on the basis of a vertical reference straight line VRL extending perpendicular to the horizontal reference straight line HRL (refer to FIG. 12D), among the plurality of points included in the ROI.

Figure 12F:
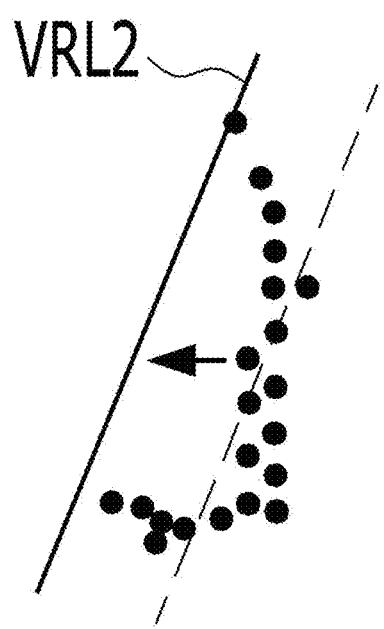

Thereafter, as shown in FIG. 12F, a second vertical reference straight line VRL2 is obtained. The second vertical reference straight line VRL2 passes through the point having the largest y-axis coordinate value on the basis of the vertical reference straight line VRL shown in FIG. 12D, among the plurality of points included in the ROI. Here, the first and second vertical reference straight lines VRL1 and VRL2 are parallel to the vertical reference straight line VRL.

Thereafter, the first and second horizontal reference straight lines HRL1 and HRL2 and the first and second vertical reference straight lines VRL1 and VRL2 intersect to form four corner points. Thus, a candidate box, which has a certain inclination and is defined by the four points, may be generated, as shown in FIG. 13.

The four straight lines HRL1, HRL2, VRL1 and VRL2 defining the candidate box may be expressed using Equations 13 to 16 below.

HRL1: $y=mx+(y_1-mx_1) \ldots (x_1,y_1):(x_j,y_j)$ when distance$(x_j,y_j,m)$ was maximum in $U(j=0, 1, \ldots, m-1)$ [Equation 13]

HRL2: $y=mx+(y_2-mx_2) \ldots (x_2,y_2):(x_j,y_j)$ when distance$(x_j,y_j,m)$ was minimum in $U(j=0, 1, \ldots, m-1)$ [Equation 14]

VRL1: $y=m'x+(y_3-m'x_3) \ldots (x_3,y_3):(x_j,y_j)$ when distance$(x_j,y_j,m')$ was minimum in $U(j=0, 1, \ldots, m-1)$ [Equation 15]

VRL2: $y=m'x+(y_4-m'x_4) \ldots (x_4,y_4):(x_j,y_j)$ when distance$(x_j,y_j,m')$ was maximum in $U(j=0, 1, \ldots, m-1)$ [Equation 16]

In Equations 13-16 above, "U" represents a set of points and is expressed using Equation 17 below, "m" and "m'" are expressed using Equations 9 and 10 set forth above, respectively, "distance$(x_j, y_j, m)$" corresponds to "distance$(x_i, y_i, m)$" shown in FIG. 5 if the subscript "i" changes into "j", and "j" represents the unique number of a point, which distinguishes the point from other points.

$U=\{p|p(x_j,y_j),j=0,1,2,\ldots,m-1\}$ [Equation 17]

Here, "m" represents the number of points.

Comparing Equations 4-8 according to the above-described embodiment with Equations 13-17 according to the comparative example, since the number m of points is much larger than the number n of unit pixels, it can be seen that the amount of computation for generating a candidate box in the embodiment is much less than that in the comparative example.

The comparative example is described further on the assumption that a plurality of candidate boxes are obtained as explained in step 32 according to the embodiment described above with reference to FIG. 3. The cost of each of the plurality of candidate boxes is calculated as explained in step 34 of FIG. 3.

Figure 14:
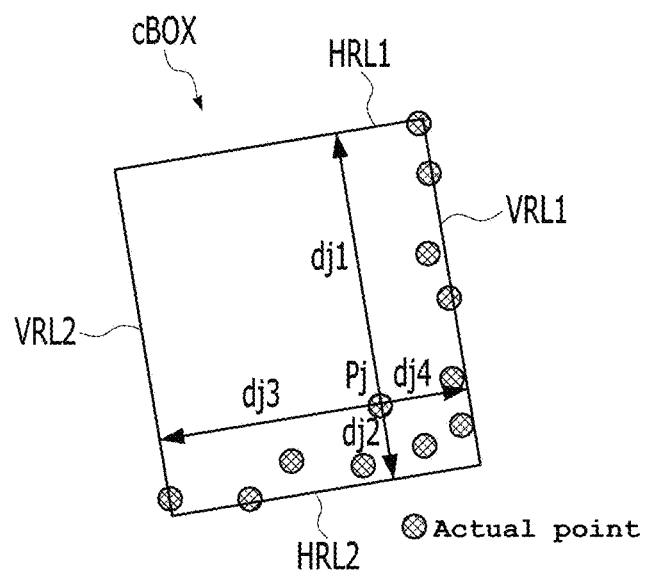
FIG. 14 is a diagram for explaining a cost calculation method according to the comparative example.

FIG. 14 is a diagram for explaining the cost calculation method according to the comparative example. In order to help understanding a comparison between the comparative example and the embodiment, the distribution of points shown in FIG. 14 is the same as that in FIG. 2A.

According to the comparative example, the cost of the candidate box shown in FIG. 13, which is obtained through the processes shown in FIGS. 12A-12F, is calculated as follows.

First, the spacing distances between the coordinates of each of the points included in the ROI and respective sides of a candidate box are obtained. For example, referring to FIG. 14, the spacing distances d 1, $d_j$2, d 3 and d 4 between each (e.g. $p_j$) of the points included in the ROI and respective sides HRL1, HRL2, VRL1 and VRL2 of a candidate box cBOX are obtained.

Thereafter, the minimum value among the spacing distances is obtained using Equation 18 below.

$c_j=\min(d_j1,d_j2,d_j3,d_j4)$ [Equation 18]

Here, "$c_j$" represents the minimum value among the spacing distances $d_j$1, $d_j$2, $d_j$3 and $d_j$4.

For example, referring to FIG. 14, the minimum value (e.g. $d_j$2) among the spacing distances $d_j$1, $d_j$2, $d_j$3 and $d_j$4 is obtained.

Thereafter, the minimum values of all of the points included in the ROI are summed, as expressed using Equation 19 below, and the result of the summing is determined to be the cost of a candidate box.

$$C'_\theta = \sum_{j=0}^{m-1} c_j$$ [Equation 19]

Here, "$C'_\theta$" represents the cost of a candidate box.

It can be seen that the amount of computation for obtaining the cost of each of the candidate boxes using Equations 11 and 12 according to the embodiment is much less than that using Equations 18 and 19 according to the comparative example. The reason for this is that the number n of unit pixels is much smaller than the number m of points included in the ROI.

As a result, since the embodiment performs pixel-based computation, the amount of computation may be reduced compared to the comparative example, which performs point-based computation.

Figure 15A:
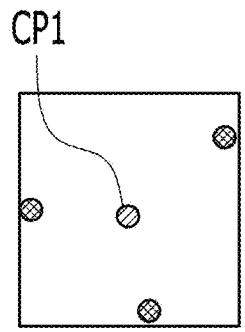
FIGS. 15A-15C are diagrams showing a change of points within a unit pixel.
Figure 15B:
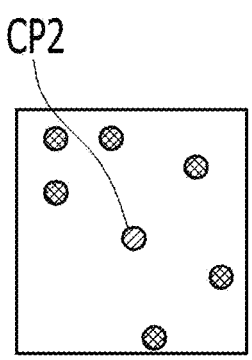
Figure 15C:
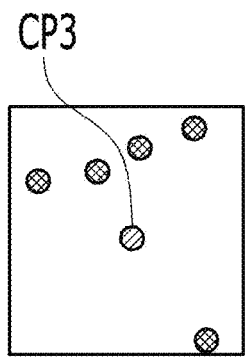

FIGS. 15A-15C are diagrams showing a change of points within a unit pixel.

If the shape of an object is uniform, for example, in the case of a stopped vehicle, a constant heading angle needs to be generated. However, in the comparative example, as shown in FIGS. 12-14, since the points input to the LiDAR sensor 110 change minutely in each frame when the heading angle is extracted based on points, there may occur a phenomenon in which the heading angle shakes due to the change of points.

In contrast, in the embodiment, the heading angle is extracted based on unit pixels, rather than points. Accordingly, even if the points input to the LiDAR sensor 110 change minutely in each frame or noise occurs, the heading angle does not shake. In other words, according to the embodiment, since the heading angle is extracted based on the coordinates of the centers CP1, CP2 and CP3 of the respective unit pixels, even if the points change within the range of the unit pixels as shown in FIGS. 15A-15C, it is possible to extract a correct heading angle without being affected by the change of points.

In addition, since the area (or size) of the unit pixel may be adjusted according to the distance from the host vehicle to the ROI, it is possible to extract a correct heading angle without being affected by the spacing distance between the host vehicle to the ROI. In other words, the embodiment is capable of minimizing the influence of a minute change in the distribution of points on extraction of the heading angle and is thus robust to a minute change of LiDAR points and noise.

Figure 16A:
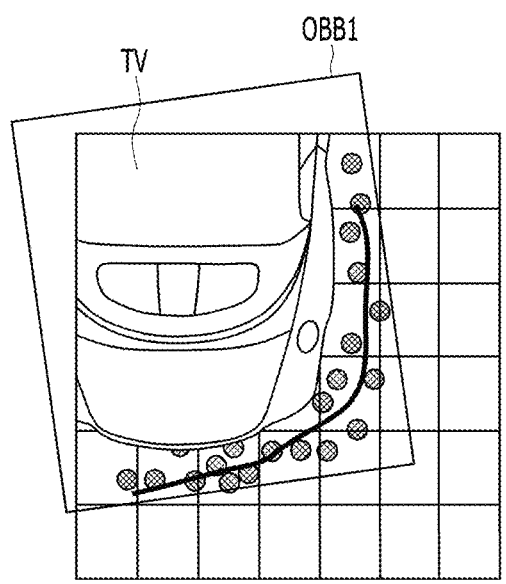
FIGS. 16A and 16B show oriented bounding boxes obtained by the comparative example and an embodiment of the present disclosure when the object is a target vehicle having a curved shape.
Figure 16B:
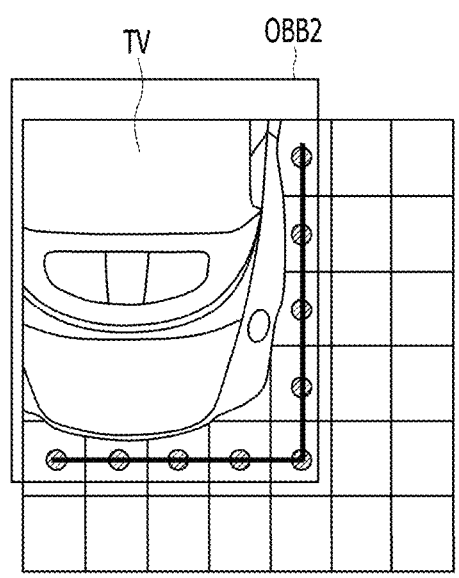

FIGS. 16A and 16B show oriented bounding boxes obtained by the comparative example and an embodiment, respectively, when the object is a target vehicle having a curved shape.

Since the corners of the front bumper and the rear bumper of the target vehicle TV have a curved shape, when a heading weight is given to points corresponding to the curved part, an incorrect heading angle may be output. The oriented bounding box has a rectangular shape, and two directional components perpendicular to each other are important. Referring to FIG. 16A, the curved shape formed near a vertex adversely affects extraction of the heading angle. In other words, like the comparative example, when the oriented bounding box is generated based on individual points, the continuous curved shape of the target vehicle TV affects calculation of the heading angle, and the oriented bounding box OBB1 may be generated in a distorted shape, as shown in FIG. 16A. In contrast, according to the embodiment, since an oriented bounding box is generated based on unit pixels, the curved shape of the target vehicle TV is prevented from affecting calculation of the heading angle by discretizing the curved shape of the target vehicle TV according to the size of the pixel. Accordingly, the oriented bounding box OBB2 may be generated straight without being distorted, as shown in FIG. 16B. In other words, according to the embodiment, since the heading angle is extracted based on pixels, it is possible to minimize the influence of the curved shape of the target vehicle on extraction of the heading angle.

Figure 17A:
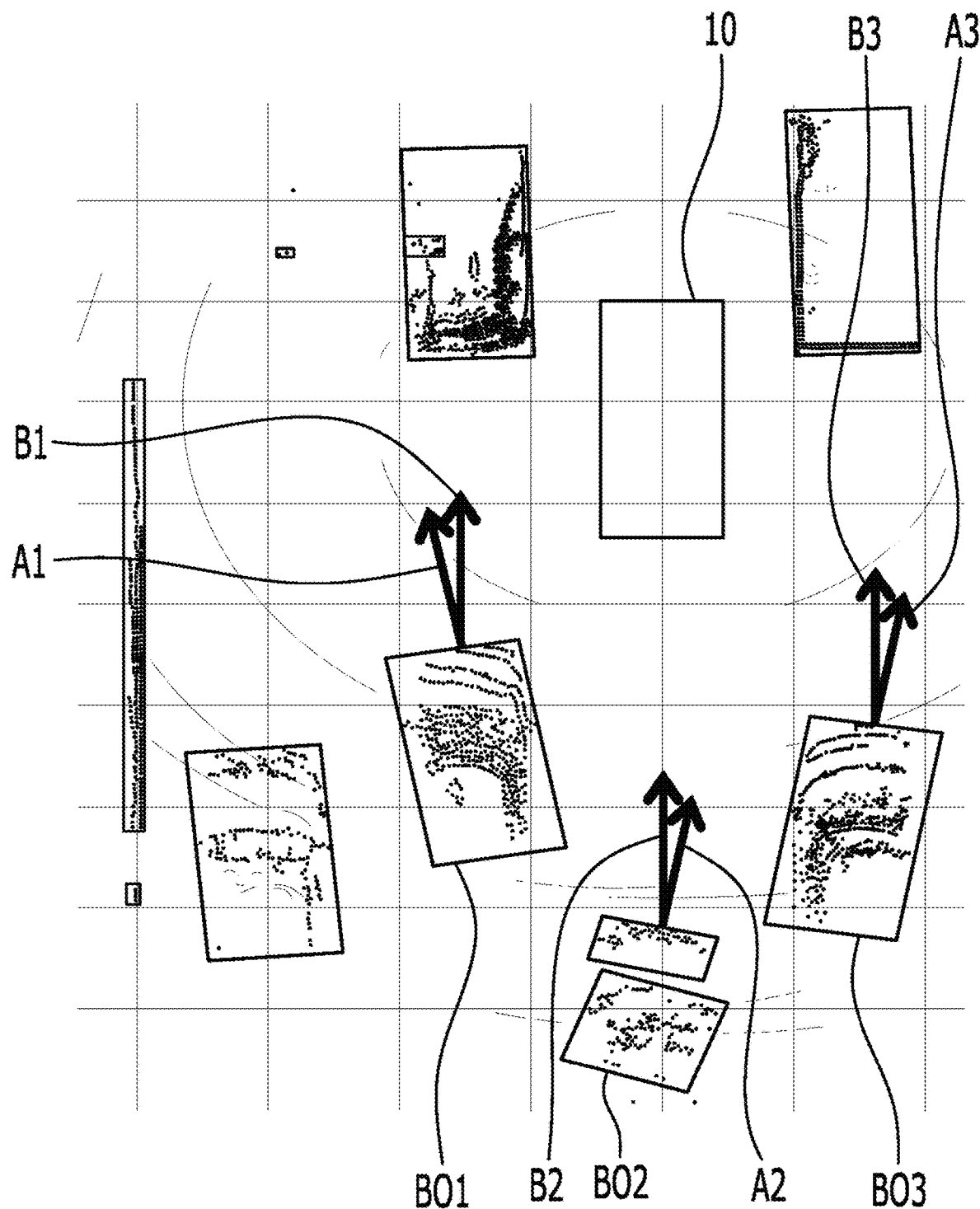
FIGS. 17A and 17B show oriented bounding boxes generated by the comparative example and an embodiment of the present disclosure.
Figure 17B:
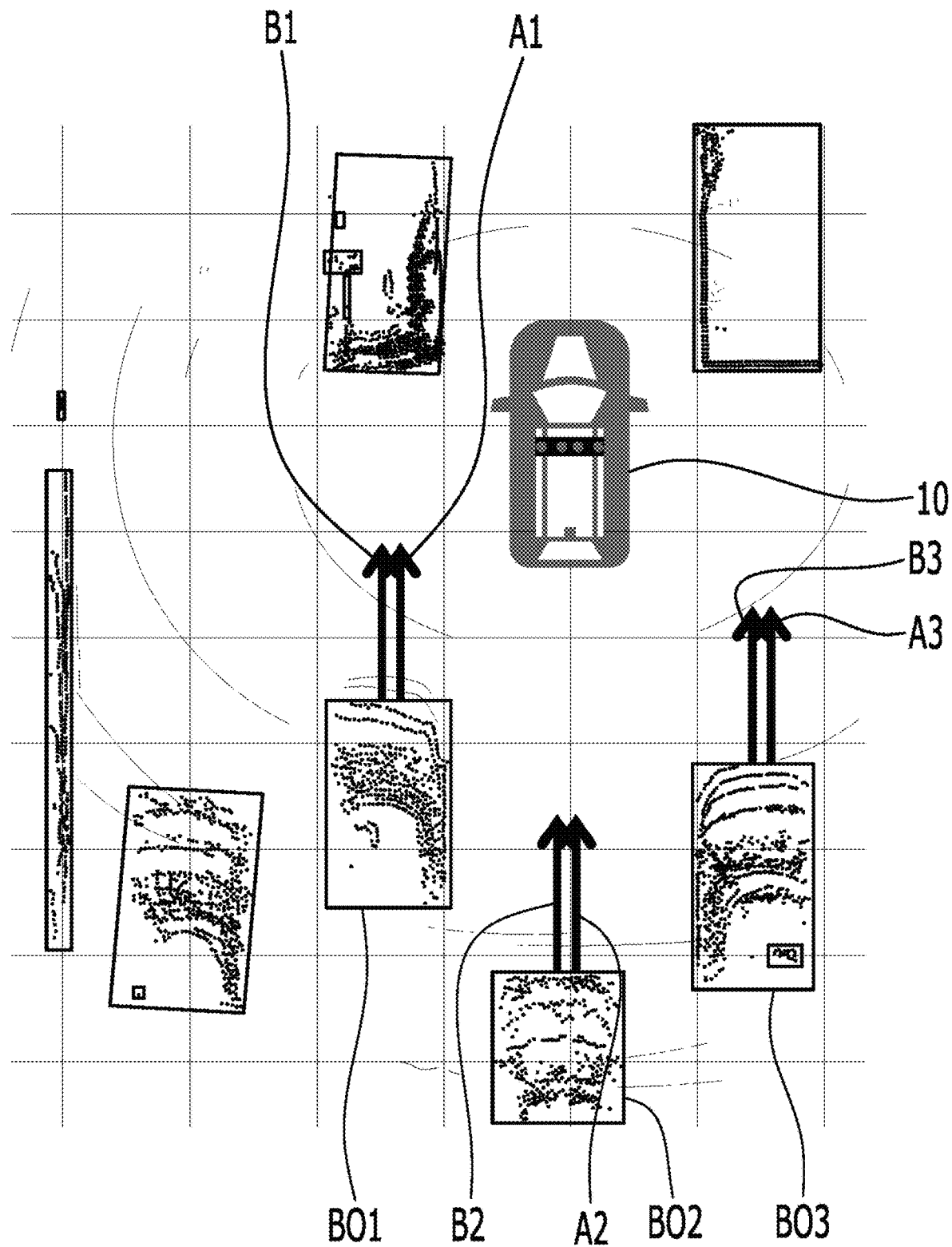

FIGS. 17A and 17B show oriented bounding boxes (e.g. BO1, BO2 and BO3) generated by the comparative example and the embodiment. Here, the oriented bounding boxes BO1, BO2 and BO3 are shown on the basis of the host vehicle 10.

As described above, in the comparative example, the heading angle shakes due to the change of pointers. Thus, the extracted heading angles A1, A2 and A3 do not coincide with the actual heading angles B1, B2 and B3 of objects, as shown in FIG. 17A. Further, since the corners of the front bumper and the rear bumper of a target vehicle, which is an object, have a curved shape, the oriented bounding boxes BO1, BO2 and BO3 have a distorted shape, as shown in FIG. 17A.

In contrast, according to the embodiment, even if the points change, the heading angle does not shake, so the extracted heading angles A1, A2 and A3 coincide with the actual heading angles B1, B2 and B3 of objects, as shown in FIG. 17B. Further, even if the corners of the front bumper and the rear bumper of a target vehicle, which is an object, have a curved shape, the oriented bounding boxes BO1, BO2 and BO3 are generated straight without being distorted, as shown in FIG. 17B, unlike those shown in FIG. 17A.

Furthermore, in the comparative example, because the corners of the front bumper and the rear bumper of a target vehicle, which is an object, have a curved shape, a heading weight is given to points corresponding to the curved part. In contrast, according to the embodiment, it is possible to accurately extract the heading angle of a vehicle having a curved shape without giving a weight to points corresponding to the curved part.

Figure 18A:
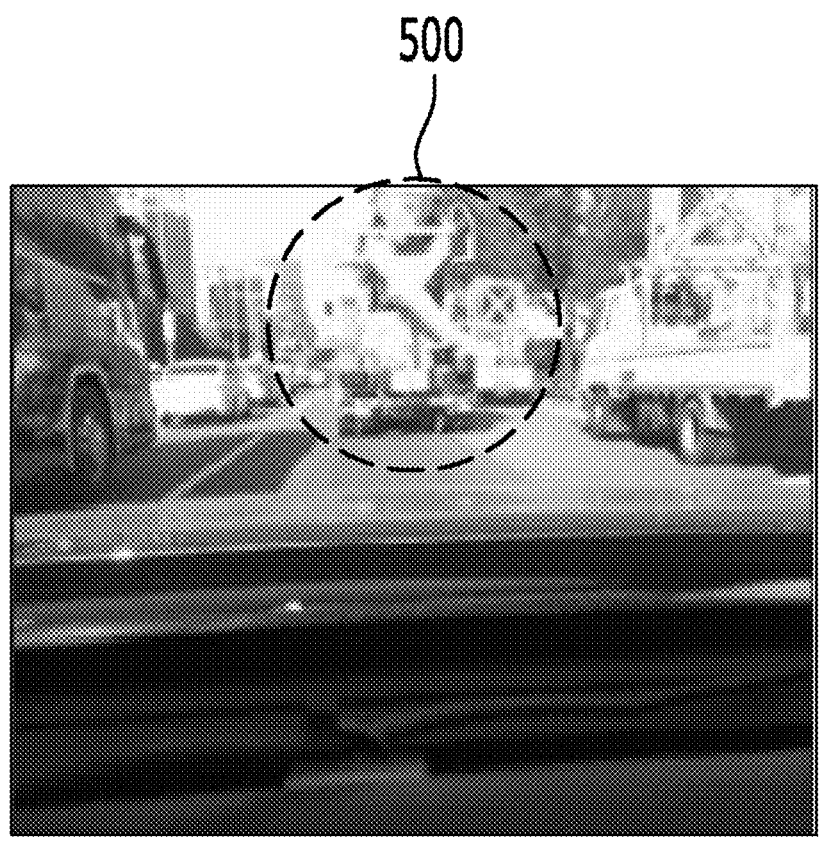
FIGS. 18A-18C show oriented bounding boxes obtained by the comparative example and an embodiment of the present disclosure.
Figure 18B:
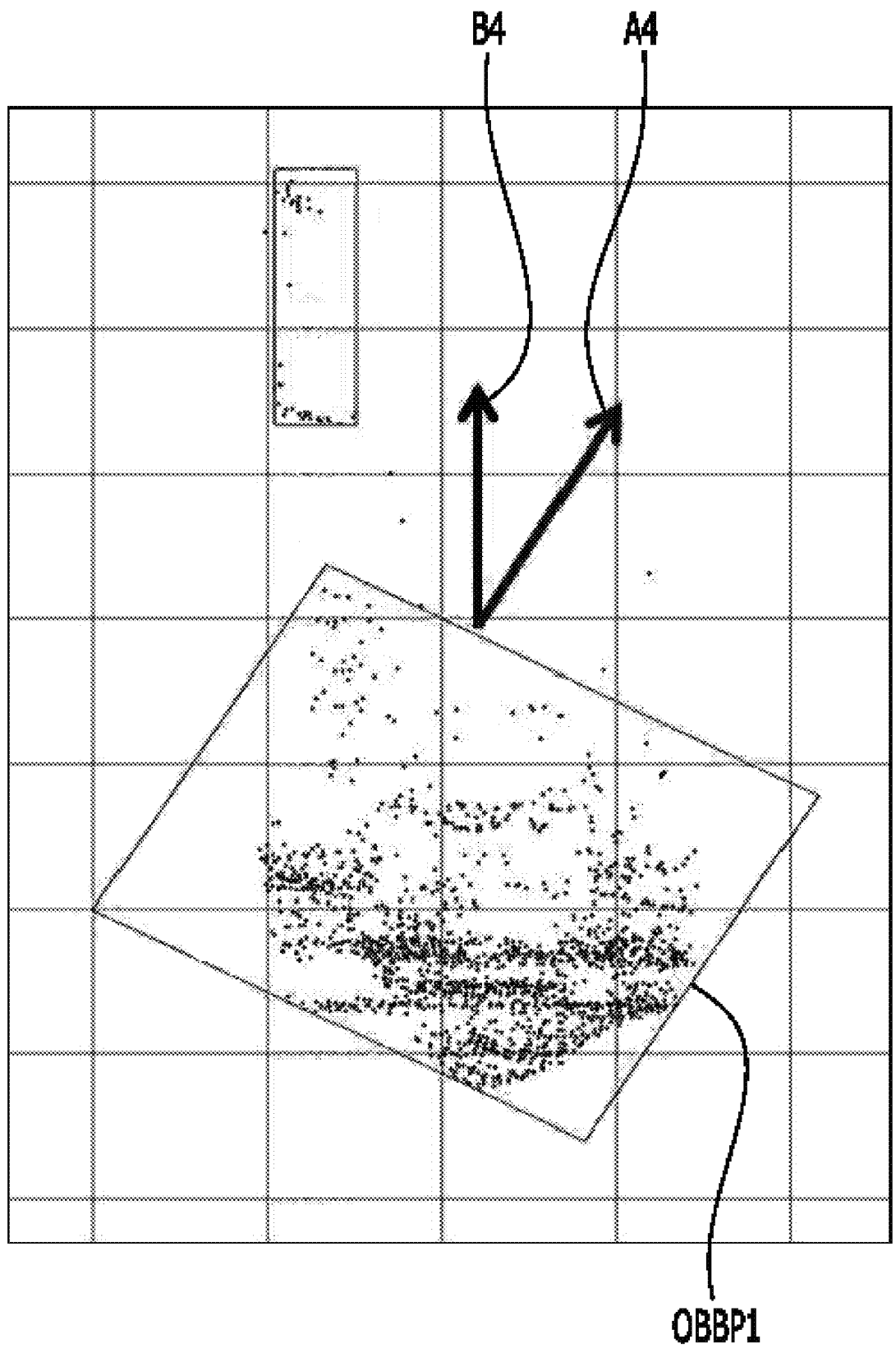
Figure 18C:
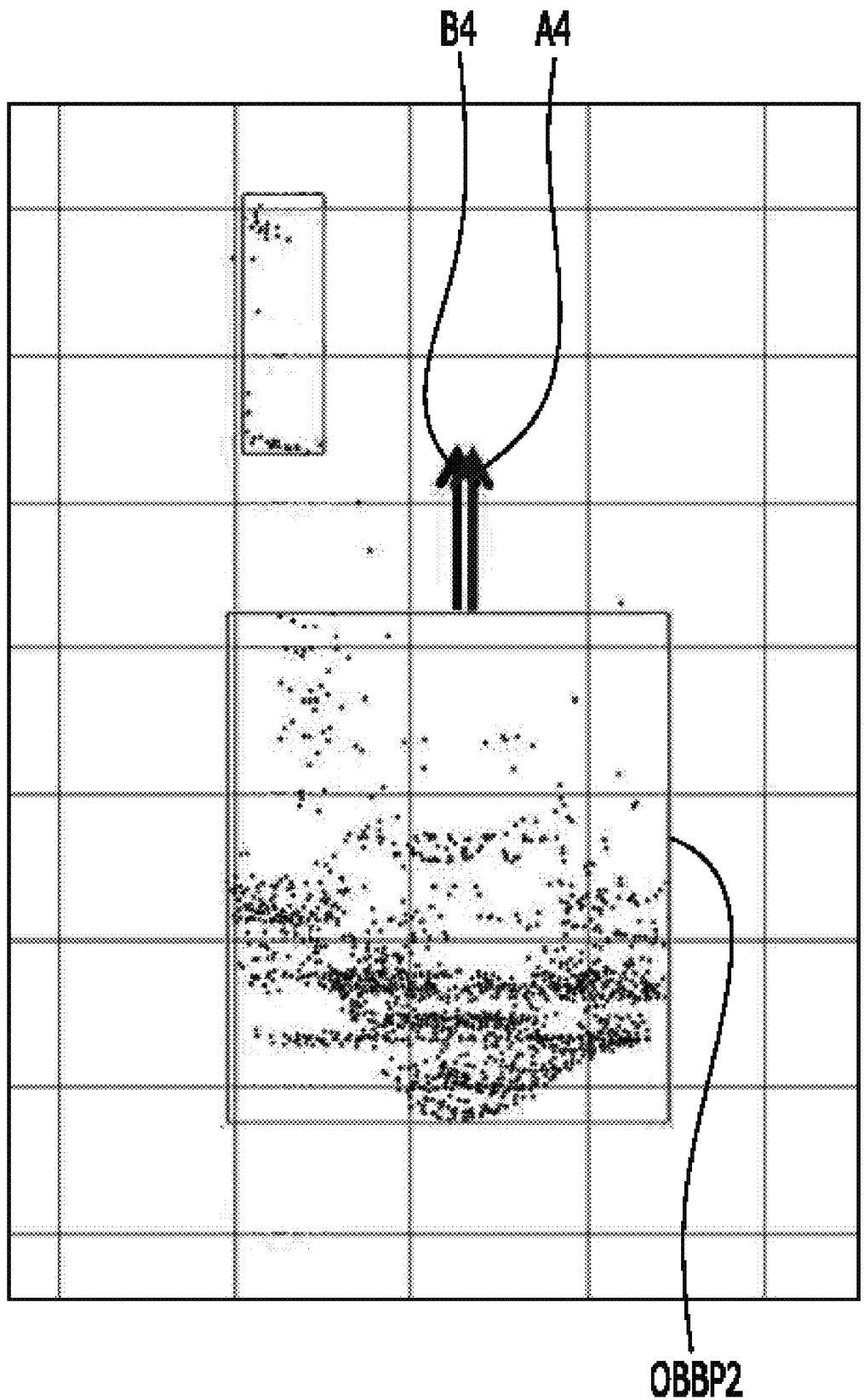

FIGS. 18A-18C show oriented bounding boxes obtained by the comparative example and the embodiment.

When an object 500 is a high-elevation structure (e.g. a ready-mix concrete truck), as shown in FIG. 18A, the oriented bounding box OBBP1 generated based on points, as in the comparative example, has a distorted shape, and the extracted heading angle A4 does not coincide with the actual heading angle B4 of the object 500. In contrast, as shown in FIG. 18B, the oriented bounding box OBBP2 generated based on unit pixels, as in the embodiment, has a straight shape, and the extracted heading angle A4 coincides with the actual heading angle B4 of the object 500.

In addition, the object-tracking method and apparatus according to the embodiments may more stably track an object using an oriented bounding box generated based on a heading angle that is stably and accurately extracted. In other words, in the comparative example, when a shaking heading angle is used, a heading error occurs in every frame, and consequently, the moving direction of the object that is being finally tracked also shakes. In contrast, according to the embodiment, since a heading angle is stably extracted, a heading error does not occur.

In addition, when tracking an object, the comparative example needs to analyze and process a heading error using separate logic. In contrast, according to the embodiment, since a heading angle is stably extracted, a heading error does not occur, so the analysis and processing performed in the comparative example may be omitted. As a result, according to the embodiment, it is possible to stably and accurately extract a heading angle and to accurately recognize the moving direction of a target vehicle using an oriented bounding box generated based on the correct heading angle. Thus, the performance of recognizing the traveling environment of a vehicle is improved, such as, for example, sudden approach of another vehicle, which is essential to autonomous driving. In other words, the embodiment may contribute to improvement of the object-tracking performance and traveling environment recognition performance by stably providing a correct heading angle.

The pixel data generated by the method 10 of generating pixel data of an object according to the above-described embodiment may also be applied to U.S. Patent Publication No. 2019/0004166 (entitled "METHOD TO DETERMINE THE ORIENTATION OF A TARGET VEHICLE") (hereinafter referred to as the "conventional art"). In other words, the reference angle extraction method and the cost calculation method proposed in the conventional art may be utilized as they are, whereas the pixels generated by the method 10 of generating pixel data of an object according to the embodiment, rather than points, may be applied to the source of the calculation.

In addition, the method 10 of generating pixel data of an object according to the above-described embodiment may also be applied to other types of sensors (e.g. a laser sensor, a three-dimensional stereo camera, and a distance sensor) capable of generating and outputting a point cloud or providing a point cloud through transformation.

In addition, the pixel data generated by the method 10 of generating pixel data of an object according to the embodiment may be used to generate an oriented bounding box, as described above, and may also be used in the manner of being transformed in other modules to implement object classification, clustering, and tracking. For example, the pixel data generated by the method 10 of generating pixel data of an object according to the embodiment may be transformed and used for machine learning and image processing.

Figure 19A:
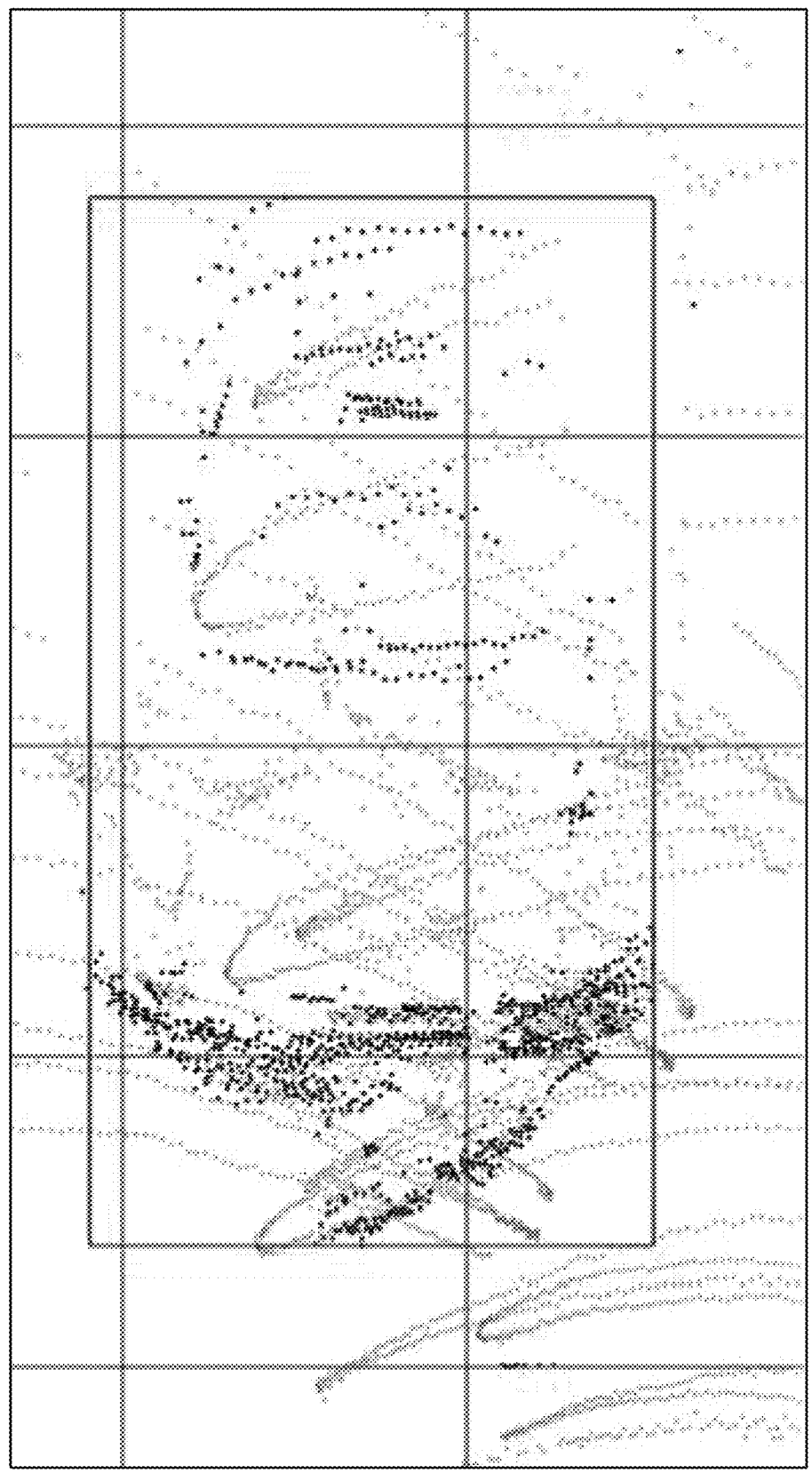

FIGS. 19A and 19B are diagrams for explaining an application example of the embodiment.

FIG. 19A shows a real coordinate system and FIG. 19B shows a discrete coordinate system obtained by sampling the real coordinate system shown in FIG. 19A in the form of the pixel data shown in FIG. 2D. As such, since the lattice map generated by the method 10 of generating pixel data of an object according to the embodiment has a data structure similar to that of an image, it may be usefully applied to operations performed in various image-processing fields such as convolution and machine learning. For example, the method 10 of generating pixel data of an object according to the embodiment may be applied to application technologies such as histogram analysis, feature extraction, noise removal, mask filtering, contour detection, and machine learning.

As is apparent from the above description, according to a method of generating pixel data of an object, a method of determining the orientation of an object, a method and apparatus for tracking an object, and a recording medium storing a program to execute the methods according to embodiments, since calculation is performed based on pixels, the amount of computation for generating candidate boxes or the amount of computation for obtaining the cost of each candidate box is much less than that in the comparative example. In addition, the embodiments are capable of minimizing the influence of a minute change in the distribution of points on extraction of a heading angle and are thus robust to a minute change of LiDAR points and noise. In addition, it is possible to minimize the influence of the curved shape of a target vehicle on extraction of a heading angle. In addition, since a heading angle is stably extracted, a heading error does not occur. In addition, it is possible to improve the object-tracking performance and traveling environment recognition performance by stably providing a correct heading angle.

However, the effects achievable through the disclosure are not limited to the above-mentioned effects. Other effects not mentioned herein should be clearly understood by those having ordinary skill in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to specific embodiments thereof, these embodiments are only proposed for illustrative purposes, and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An object orientation determination method, comprising:
    generating pixel data on each of a plurality of unit pixels included in a region of interest of a point cloud acquired from an object; and
    generating a plurality of candidate boxes using the generated pixel data, and determining, as a heading angle of an oriented bounding box, an inclination of a candidate box having a smallest cost among costs calculated on the plurality of candidate boxes,
    wherein a cost of each of the plurality of candidate boxes is calculated based on positions of respective sides of a corresponding one of the plurality of candidate boxes and the generated pixel data.

2. The method according to claim 1, wherein the generating of the pixel data comprises:
    generating a lattice map, composed of the plurality of unit pixels, with respect to the region of interest in the point cloud;
    selecting a reference point of the region of interest;
    generating a pixel index indicating a corresponding unit pixel, in which each of all points present in the region of interest is included, among the plurality of unit pixels in the lattice map, with respect to the reference point; and
    generating the pixel data, including information about the number of points included in each of the plurality of unit pixels in the region of interest and center coordinates of each of the plurality of unit pixels, using the pixel index.

3. The method according to claim 2, wherein the pixel index of each of the points is expressed as follows:

$$IdxRow = \text{integer}\left(\frac{|x_s - x_p|}{L}\right)$$

-continued $$IdxCol = \text{integer}\left(\frac{|y_s - y_p|}{L}\right)$$

where IdxRow represents a horizontal-axis coordinate of the pixel index, IdxCol represents a vertical-axis coordinate of the pixel index, $x_s$ represents a vertical-axis coordinate of the reference point, $y_s$ represents a horizontal-axis coordinate of the reference point, $x_p$ represents a vertical-axis coordinate of each of the points to be expressed as the pixel index, $y_p$ represents a horizontal-axis coordinate of each of the points to be expressed as the pixel index, L represents a width or a length of each of the plurality of unit pixels, and integer(k) represents an integer value of k.

4. The method according to claim 3, wherein an area of each of the plurality of unit pixels is in inverse proportion to a distance that the region of interest is spaced apart from a position of an entity that acquires the point cloud.

5. The method according to claim 4, wherein a ratio of a cross-sectional area of the object to the area of each of the plurality of unit pixels is 50 to 30,000.

6. The method according to claim 2, wherein a point where a maximum value in a vertical-axis direction in the region of interest and a maximum value in a horizontal-axis direction in the region of interest meet is selected as the reference point.

7. The method according to claim 2, wherein the determining of the heading angle comprises:
generating the plurality of candidate boxes using information about the center coordinates of each of the plurality of unit pixels included in the pixel data;
calculating the costs of the plurality of candidate boxes using information about the center coordinates and the number of points included in the pixel data;
selecting the candidate box having a smallest cost among the calculated costs; and
extracting an angle of the inclination at which the selected candidate box is inclined with respect to a vertical axis, as the heading angle of the oriented bounding box,
wherein each of the plurality of candidate boxes includes all of centers of the plurality of unit pixels.

8. The method according to claim 7, wherein the plurality of candidate boxes is inclined at different angles with respect to the vertical axis.

9. The method according to claim 8, wherein the different angles range from 0° to 90°, and
wherein the plurality of candidate boxes is generated by increasing an angle by 10° with respect to the vertical axis.

10. The method according to claim 7, wherein the calculating the costs of the plurality of candidate boxes comprises:
obtaining a minimum value among spacing distances between a center of each of the plurality of unit pixels and the respective sides of a corresponding one of the plurality of candidate boxes;
multiplying the minimum value of each of the plurality of unit pixels by the number of points included in each of the plurality of unit pixels; and
summing results of multiplication of the plurality of unit pixels to determine a result of summing as a cost of each of the plurality of candidate boxes.

11. The method according to claim 7, further comprising:
generating an oriented bounding box that is inclined by the extracted heading angle with respect to the vertical axis and includes all of the points present in the region of interest.

12. An object-tracking method, comprising:
tracking the object using the oriented bounding box generated by the object orientation determination method described in claim 1.

13. The object-tracking method according to claim 12, wherein the tracking of the object comprises recognizing a moving direction of the object using the oriented bounding box.

14. An object-tracking apparatus, comprising:
a data generation unit configured to generate pixel data based on a point cloud acquired from an object;
a heading angle extraction unit configured to extract a heading angle of an oriented bounding box from the pixel data;
a bounding box generation unit configured to generate the oriented bounding box using the extracted heading angle; and
an object-tracking unit configured to track the object using the oriented bounding box,
wherein the data generation unit generates a lattice map, composed of a plurality of unit pixels, with respect to a region of interest in the point cloud, selects a reference point of the region of interest, generates a pixel index indicating a corresponding unit pixel, in which each of all points present in the region of interest is included, among the plurality of unit pixels in the lattice map, with respect to the reference point, and generates pixel data, including information about the number of points included in each of the plurality of unit pixels in the lattice map and center coordinates of each of the plurality of unit pixels, using the pixel index,
wherein the heading angle extraction unit generates a plurality of candidate boxes using information about the center coordinates of each of the plurality of unit pixels included in the pixel data, calculates costs of the plurality of candidate boxes using information about the center coordinates and the number of points included in the pixel data, selects a candidate box having a smallest cost among the calculated costs, and extracts an angle at which the selected candidate box is inclined with respect to a vertical axis as a heading angle of an oriented bounding box,
wherein each of the plurality of candidate boxes includes all of centers of the plurality of unit pixels, and
wherein the plurality of candidate boxes is inclined at different angles with respect to the vertical axis.

* * * * *